United States Patent [19]

Sumi et al.

[11] Patent Number: 5,796,683
[45] Date of Patent: Aug. 18, 1998

[54] MAGNETO-OPTICAL RECORDING DEVICE HAVING A CONTROLLABLE POLARIZING FILTER

[75] Inventors: Satoshi Sumi; Kenji Tanase, both of Gifu; Yoshihisa Suzuki, Aichi; Atsushi Yamaguchi; Yoichi Tsuchiya, both of Gifu, all of Japan

[73] Assignee: Sanyo Electric Co., Ltd., Osaka, Japan

[21] Appl. No.: 823,757

[22] Filed: Mar. 25, 1997

[30] Foreign Application Priority Data

Mar. 26, 1996 [JP] Japan ............................. 8-070609
Apr. 16, 1996 [JP] Japan ............................. 8-094105

[51] Int. Cl.$^6$ ............................................. G11B 11/00
[52] U.S. Cl. .................................... 369/13; 369/118
[58] Field of Search ...................... 369/13, 118, 112, 369/110, 14, 103; 359/19; 250/201.5

[56] References Cited

U.S. PATENT DOCUMENTS

| | | | |
|---|---|---|---|
| 4,411,500 | 10/1983 | Yonezawa et al. | 369/118 |
| 4,460,990 | 7/1984 | Opheij | 369/118 |
| 5,281,797 | 1/1994 | Tatsuno et al. | 369/118 |
| 5,446,565 | 8/1995 | Komma et al. | 369/112 |
| 5,638,353 | 6/1997 | Takahashi | 369/118 |
| 5,665,957 | 9/1997 | Lee et al. | 369/118 |

FOREIGN PATENT DOCUMENTS 5-303766  11/1993  Japan .

OTHER PUBLICATIONS

High Density Optical Recording by Superresolution, Yukata Yamanaka et al; Japanese Journal of Applied Physics, vol. 28, Supplement 28–3, pp. 197–200, 1989 (no month available).

Recent progress in Magnetically Induled Superresolution, M. Kaneko et al; Journal of Magnetics Society of Japan, vol. 20, Supplemnt No. S1, pp. 7–12, pp. 7–12, 1996 (no month available).

T. Kawaguchi, Ceramic vol. 29, No. 9, pp. 838–839, 1984, no month available.

*Primary Examiner*—Tan Dinh
*Attorney, Agent, or Firm*—Armstrong, Westerman, Hattori, McLeland & Naughton

[57] ABSTRACT

An information recording and reproduction apparatus for a magnetically induced superresolution magneto-optical recording medium includes an optical head that emits a laser beam to a signal recording plane of the medium and detecting a laser beam reflected therefrom. The optical head includes a polarization plane rotary unit and a polarizing filter between a light source and an objective lens. The polarization plane rotary unit transmits the laser beam while rotating the direction of polarization of the laser beam. The polarizing filter allows the laser beam to be transmitted at the outer portion independent of the direction of polarization, and allows only the laser beam that is polarized in a particular direction to be transmitted at the inner portion. The polarization plane rotary unit is controlled so as to rotate the direction of polarization of the laser beam in a direction different from the particular direction in reproduction. Thus, the optical superresolution method is carried out with the inner portion of the laser beam for radiation blocked only in reproduction.

21 Claims, 26 Drawing Sheets

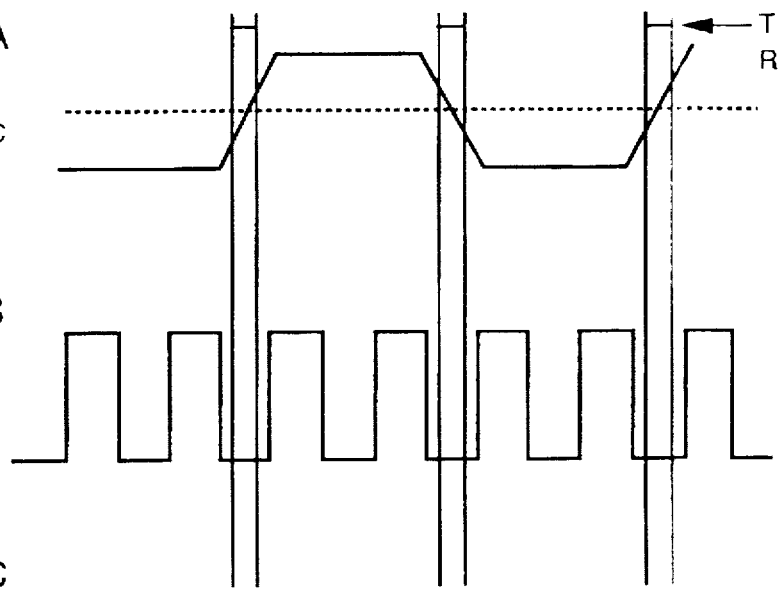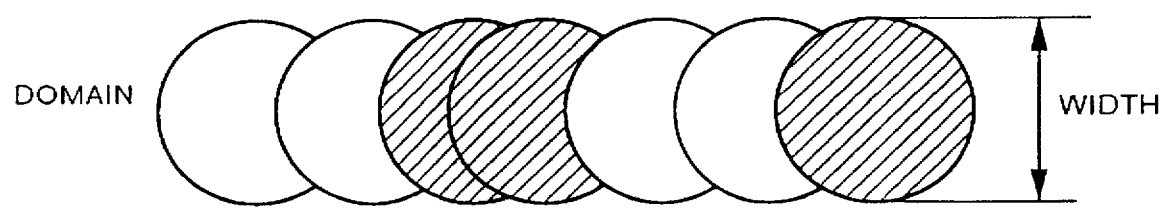

50

51

— SILVER ATOM DEPOSITION REGION

— SILVER COMPOUND ORIENTATION REGION

GENERAL DISK

M.S.R

MAGNETO-OPTICAL RECORDING DEVICE HAVING A CONTROLLABLE POLARIZING FILTER

BACKGROUND OF THE INVENTION

1. Field of the Invention

The present invention relates to recording and reproduction apparatuses for magneto-optical recording media, and more particularly, to an information recording and reproduction apparatus that can carry out recording and reproduction on and from a magnetically induced superresolution magneto-optical recording medium at high density using a single optical system.

2. Description of the Background Art

A magneto-optical recording medium is noteworthy of its rewritable ability, large storage capacity, and high reliability. It is already put into practical use as the memory and the like for computers. However, the recording and reproducing technique of information at higher density is required in accordance with increase in the amount of information to be recorded and reduction in the size of the recording and reproduction apparatus.

The technique for recording and reproducing information at higher density is divided into the technique at the recording and reproduction apparatus end and the technique of the recording medium end.

The former includes, in addition to the method of rendering the wavelength of a laser beam shorter, the so-called optical superresolution method. This method achieves a focused spot that exceeds the diffraction limit of a laser beam by inserting a light blocking object in the light path of the laser beam. This optical superresolution method is disclosed in "High Density Optical Recording by Superresolution", Japanese Journal of Applied Physics, Vol. 28, Supplement 28-3, pp. 197–200, 1989 by Y. Yamanaka et al., for example.

The latter technique includes, in addition to the method of narrowing the pitch of the recording track of the medium, the method of improving the reproduction resolution using a magnetic multilayer film. This art of improving reproduction resolution using a magnetic multilayer film includes the step of providing a magneto-optical recording medium with a magnetic multilayer film having a recording layer and a reproduction layer. By taking advantage that the temperature distribution within the laser spot exhibits a Gaussian distribution that takes the maximum value around the center thereof, the magnetized state of the recording layer is selectively transferred to the reproduction layer by virtue of the exchange-couple force when being irradiated with a laser beam for reproduction. The magnetized state of that reproduction layer is read out at high density with a laser beam of a light power that is lower than that of recording. This technique is disclosed, for example, in "Recent Progress in Magnetically Induced Superresolution", Proceedings of Magneto-Optical Recording International Symposium '96, Journal of Magnetics Society of Japan, Vol. 20, Supplement No. Si, pp. 7–12, 1996 by M. Kaneko et al.

Problems set forth in the following are encountered when information is recorded on a magneto-optical recording medium having a magnetic multilayer film by using the above-described optical superresolution method.

In the optical superresolution method, the entire light power of the laser beam is lowered since a light blocking object is inserted in the light path of the laser beam. Therefore, the temperature within the laser spot will not rise sufficiently up to the temperature (approximately 250° C.) that is required to carry out recording onto a recording layer, with a laser light source of the typical light power, resulting in difficulty in carrying out effective recording of information on a recording layer. As a result, there is a problem that data of a high transfer rate cannot be recorded effectively on a medium. If the entire light power is to be increased, on the other hand, a laser source of a light power that is greater than the conventional one will be required.

When information is reproduced from the magneto-optical recording medium having the above-described magnetic multilayer film using the above-described optical superresolution method, the following advantage is obtained. The temperature within the laser spot (approximately 150° C.) required to read out information from a reproduction layer can easily be achieved with a laser beam of a typical light power while the substantial reproduction region can be made smaller than the diameter of the laser beam by applying the optical superresolution method to the laser beam for reproduction. As a result, the reproduction density can be improved.

Thus, it is desirable to apply the optical superresolution method in emitting a laser beam for reproduction, but not for emitting a laser beam in recording. To satisfy this condition, an optical system for recording and an optical system for reproduction must be provided separately in one information recording and reproduction apparatus that includes both the recording and reproduction function. The structure of the information recording and reproduction apparatus for a magneto-optical recording medium will become complicated. Therefore, there was a problem that the apparatus cannot be made compact.

SUMMARY OF THE INVENTION

In view of the foregoing, an object of the present invention is to provide an information recording and reproduction apparatus that is simplified in structure, and that allows information reproduction at high density from a magneto-optical recording medium.

Another object of the present invention is to provide an information recording and reproduction apparatus for a magneto-optical recording medium that can commonly share one optical system for recording and reproduction.

A further object of the present invention is to provide an information recording and reproduction apparatus that can reproduce information at high density from a magnetically induced superresolution magneto-optical recording medium.

Still another object of the present invention is to provide an information recording and reproduction apparatus that can eliminate influence of a side lobe when using the optical superresolution method.

According to the present invention, an information recording and reproduction apparatus for a magneto-optical recording medium includes a magnetic head, an optical head, and an information reproduction circuit. The magnetic head responds to a recording signal indicating information to be recorded for applying a magnetic field to a signal recording plane of a magneto-optical recording medium. The optical head is commonly used both for recording and reproduction to emit a laser beam on the signal recording plane of the magneto-optical recording medium, and to detect a laser beam reflected from the signal recording plane. The information reproduction circuit reproduces information from the detected laser beam. The optical head includes a polarization control circuit that is adapted to block the inner portion of the laser beam emitted from the laser diode so that a laser beam formed of a main lobe and side lobes is emitted onto the signal recording plane only in a reproduction mode.

According to another aspect of the present invention, an information recording and reproduction apparatus for a magneto-optical recording medium includes a magnetic head, an optical head, and an information reproduction circuit. The magnetic head responds to a recording signal indicating information to be recorded for applying a magnetic field to a signal recording plane of the magneto-optical recording medium. The optical head is commonly used both for recording and reproduction. The optical head emits a laser beam to the signal recording plane of the magneto-optical recording medium, and detects the laser beam reflected from the signal recording plane. The information reproduction circuit reproduces information from the reproduced laser beam. The optical head further includes a light source, a polarization plane rotary unit, a polarizing filter, an objective lens, and a polarization control circuit. The light source generates the laser beam. The polarization plane rotary unit transmits the generated laser beam while selectively rotating the direction of polarization of the laser beam. The polarizing filter receives the laser beam transmitted through the polarization plane rotary unit for transmitting the laser beam at its outer portion independent of the direction of polarization, and transmitting only the laser beam that is polarized in a particular direction at its inner portion. Tracking control is provided so that the objective lens is displaced with respect to the signal recording plane. The objective lens collects the laser beam transmitted through the polarizing filter onto the signal recording plane. The polarization control circuit controls the polarization plane rotary unit to rotate the direction of polarization of the laser beam emitted from the light source in a direction differing from the particular direction, so that an inner portion of the laser beam is blocked by the polarizing filter to have a laser beam formed of a main lobe and side lobes enter the objective lens in a reproduction mode.

According to a further aspect of the present invention, an information recording and reproduction apparatus for a magneto-optical recording medium includes a magnetic head, an optical head, and an information reproduction circuit. The magnetic head responds to a recording signal indicating information to be recorded by supplying a magnetic field to a signal recording plane of the magneto-optical recording medium. The optical head commonly used for both recording and reproduction emits a laser beam on the signal recording plane of the magneto-optical recording medium, and detects the laser beam reflected from the signal recording plane. The information reproduction circuit reproduces information from the detected laser beam. The optical head further includes an light source, a polarization plane rotary unit, a polarizing filter, an objective lens, and a polarization control circuit. The light source generates a laser beam. The polarization plane rotary unit transmits the generated laser beam while selectively rotating the direction of polarization of the laser beam in different directions between the outer portion and the inner portion. The polarizing filter receives the laser beam transmitted through the polarization plane rotary unit to transmit only the laser beam that is polarized in a particular direction. Tracking control is provided so that the objective lens is displaced with respect to the signal recording plane to collect the laser beam transmitted through the polarizing filter on the signal recording plane. The polarization control circuit controls the polarization plane rotary unit to rotate the direction of polarization of the laser beam generated from the light source in a particular direction at its outer portion, and in a direction different from the particular direction at its inner portion, so that an inner portion of the laser beam is blocked by the polarizing filter to have a laser beam formed of a main lobe and side lobes enter the objective lens in reproduction.

According to a still further aspect of the present invention, the magneto-optical recording medium is a magnetically induced superresolution magneto-optical recording medium with a magnetic multilayer film structure including a recording layer and a reproduction layer.

According to yet another aspect of the present invention, the polarization plane rotary unit rotates the direction of polarization of the laser beam electrically.

According to yet another aspect of the present invention, the polarization plane rotary unit rotates the direction of polarization of the laser beam magnetically.

According to yet another aspect of the present invention, the polarizing filter or the polarization plane rotary unit has a circular inner portion.

According to yet another aspect of the present invention, the polarizing filter or the polarization plane rotary unit has a polygonal inner portion.

According to an additional aspect of the present invention, the inner portion of the polarizing filter or the polarization plane rotary unit is offset from the center of the laser beam.

The main advantage of the present invention is that the optical superresolution method can be implemented in only the laser beam for reproduction by controlling the direction of polarization of a laser beam in an information recording and reproduction apparatus with a single optical head.

Another advantage of the present invention is that information reproduction at high density of a magnetically induced superresolution magneto-optical medium can be carried out by an information recording and reproduction apparatus of a simple structure using a single optical system.

A further advantage of the present invention is that influence of a side lobe can be removed effectively even when the optical superresolution method is applied to the laser beam for reproduction.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 9A–9C are diagrams for describing the relationship of magnetic field, pulse laser beam, and recording domain.

DESCRIPTION OF THE PREFERRED EMBODIMENTS

First, a magneto-optical recording medium used for the information recording and reproduction apparatus according to an embodiment of the present invention will be described. The magneto-optical recording medium employed in the present embodiment includes a magnetic multilayer film formed of a recording layer and a reproduction layer to allow high density recording as described above. This magneto-optical recording medium will be referred to as a magnetically induced superresolution magneto-optical recording medium hereinafter.

Figure 1:
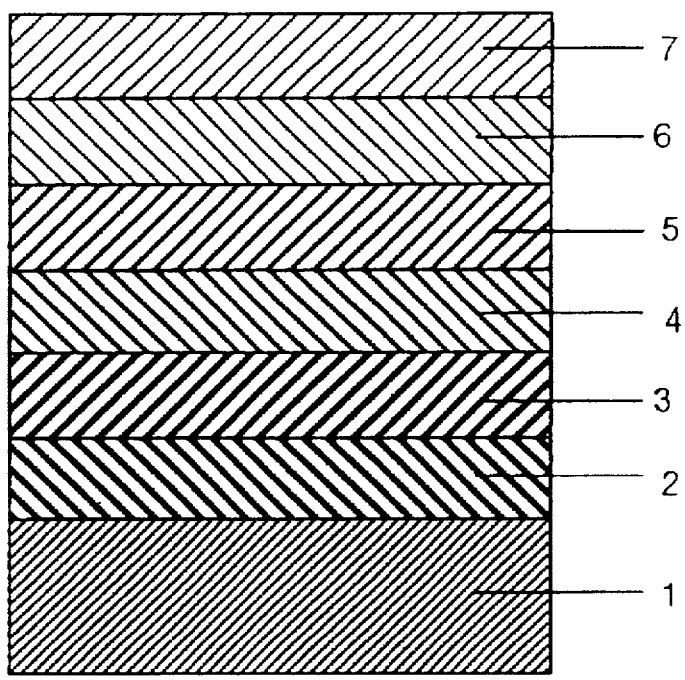
FIG. 1 is a sectional view of a stacked layer structure of a magnetically induced superresolution magneto-optical recording medium used in an embodiment of the present invention.

An example of a stacked layer structure of a magnetically induced superresolution magneto-optical recording medium used in the embodiment of the present invention will be described with reference to FIG. 1. Referring to FIG. 1, the magnetically induced superresolution magneto-optical recording medium includes a substrate 1 formed of transmissive polycarbonate, glass, and the like, a first dielectric layer 2 formed of SiN on substrate 1, a reproduction layer 3 formed of GdFeCo on first dielectric layer 2, a recording layer 4 formed of TbFeCo on reproduction layer 3, a second dielectric layer 5 formed of SiN on recording layer 4, a heat radiating layer 6 formed of a metal having a high thermal conductivity such as Al on second dielectric layer 5, and a protection layer 7 formed of ultraviolet curing resin on heat radiating layer 6.

First and second dielectric layers 2 and 5 each have a film thickness of 800 Å (tolerable error ±10 Å). Reproduction layer 3 has a film thickness of 1000 Å (tolerable error ±10 Å). Recording layer 4 has a film thickness of 500 Å (tolerable error ±10 Å). Heat radiating layer 6 has a film thickness of 200 Å (tolerable error ±10 Å). Protection layer 7 has a film thickness of 10 μm (tolerable error ±1 μm).

Figure 2:
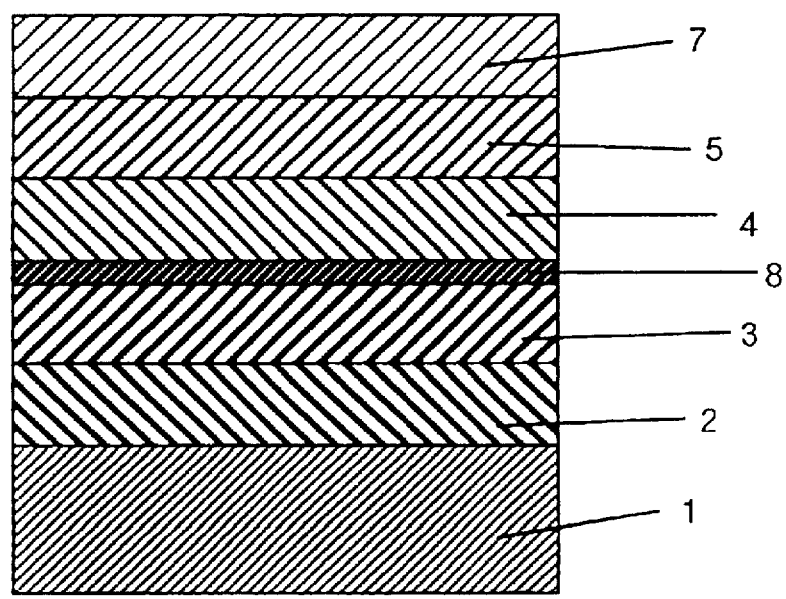
FIG. 2 is a sectional view of another stacked layer structure of a magnetically induced superresolution magneto-optical recording medium used in an embodiment of the present invention.

Another example of a stacked layer structure of a magnetically induced superresolution magneto-optical recording medium will be described with reference to FIG. 2. The stacked layer structure of FIG. 2 is similar to the stacked layer structure of FIG. 1 provided that an intermediate layer 8 is inserted between reproduction layer 3 and recording layer 4, and that heat radiating layer 6 is omitted. Intermediate layer 8 is provided to prevent transfer of magnetization from recording layer 4 to reproduction layer 3 in the low temperature portion within the laser spot when being irradiated with a laser beam for reproduction. The functional effect will be described afterwards.

In the stacked layer structure of FIG. 2, recording layer 4 is formed of TbFeCo, reproduction layer 3 and intermediate layer 8 are both formed of GdFeCo. The other layers are formed of materials identical to those of FIG. 1.

First and second dielectric layers 2 and 5 each have a film thickness of 800 Å (tolerable error ±10 Å). Reproduction layer 3 has a film thickness of 300 Å (tolerable error ±10 Å).

Intermediate layer 8 has a film thickness of 200 Å (tolerable error ±10 Å). Recording layer 3 has a film thickness of 500 Å (tolerable error ±10 Å). Protection layer 7 has a film thickness of 10 μm (tolerable error ±10 μm).

A further example of a stacked layer structure of a magnetically induced superresolution magneto-optical recording medium will be described with reference to FIG. 3. In the stacked layer structure of FIG. 3, a photochromic layer 9 is inserted between substrate 1 and first dielectric layer 2 of FIG. 1. Also, the recording layer and reproduction layer are provided as one layer 10, and heat radiating layer 6 is omitted. Photochromic layer 9 is formed of a material that has transmittance improved when is irradiated with a laser beam. The functional effect will be described afterwards.

Figure 3:
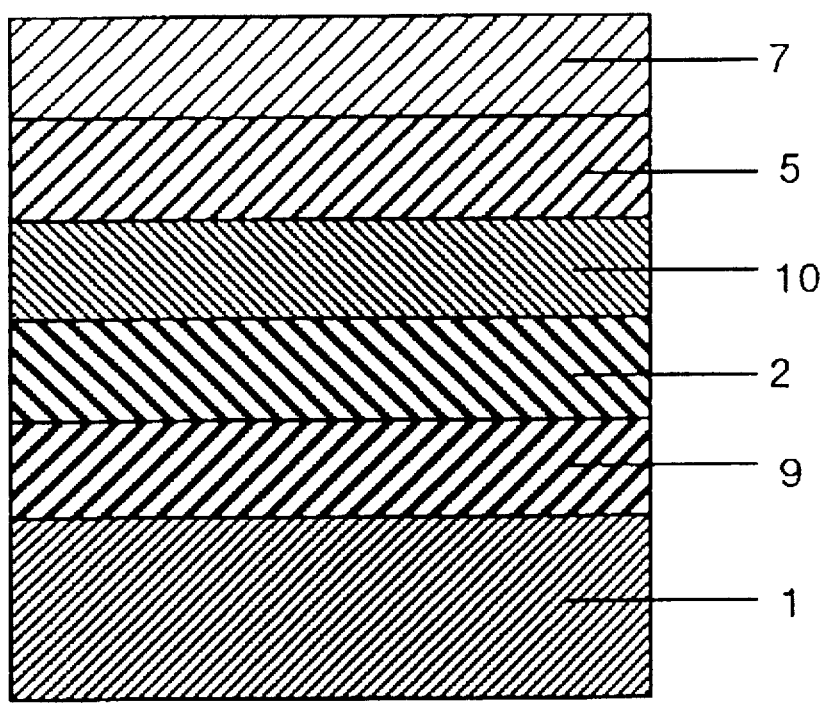
FIG. 3 is a sectional view of a further stacked layer structure of a magnetically induced superresolution magneto-optical recording medium used in an embodiment of the present invention.

In the stacked layer structure of FIG. 3, inverse photochromic mode spiropyrans, copper phthalocyanine, naphtalocyanine, and the like are appropriate as the material for photochromic layer 9. Recording and reproduction layer 10 is formed of TbFeCo. The other layers are formed of materials identical to those of FIG. 1.

First and second dielectric layers 2 and 5 each have film thickness of 800 Å (tolerable error ±10 Å). Recording and reproduction layer 10 has a film thickness of 500 Å (tolerable error ±10 Å). Protection layer 7 has a film thickness of 10 μm (tolerable error ±1 μm). Photochromic layer 9 has a film thickness of 1 μm (tolerable error ±0.1 μm).

In each of the stacked layer structures of FIGS. 1–3, first and second dielectric layers 2, 5, reproduction layer 3, recording layer 4, intermediate layer 8, and recording and reproduction layer 10 are formed by the RF magnetron sputtering method.

The entire structure of an information recording and reproduction apparatus for a magneto-optical recording medium according to an embodiment of the present invention will be described hereinafter with reference to FIG. 4.

Figure 4:
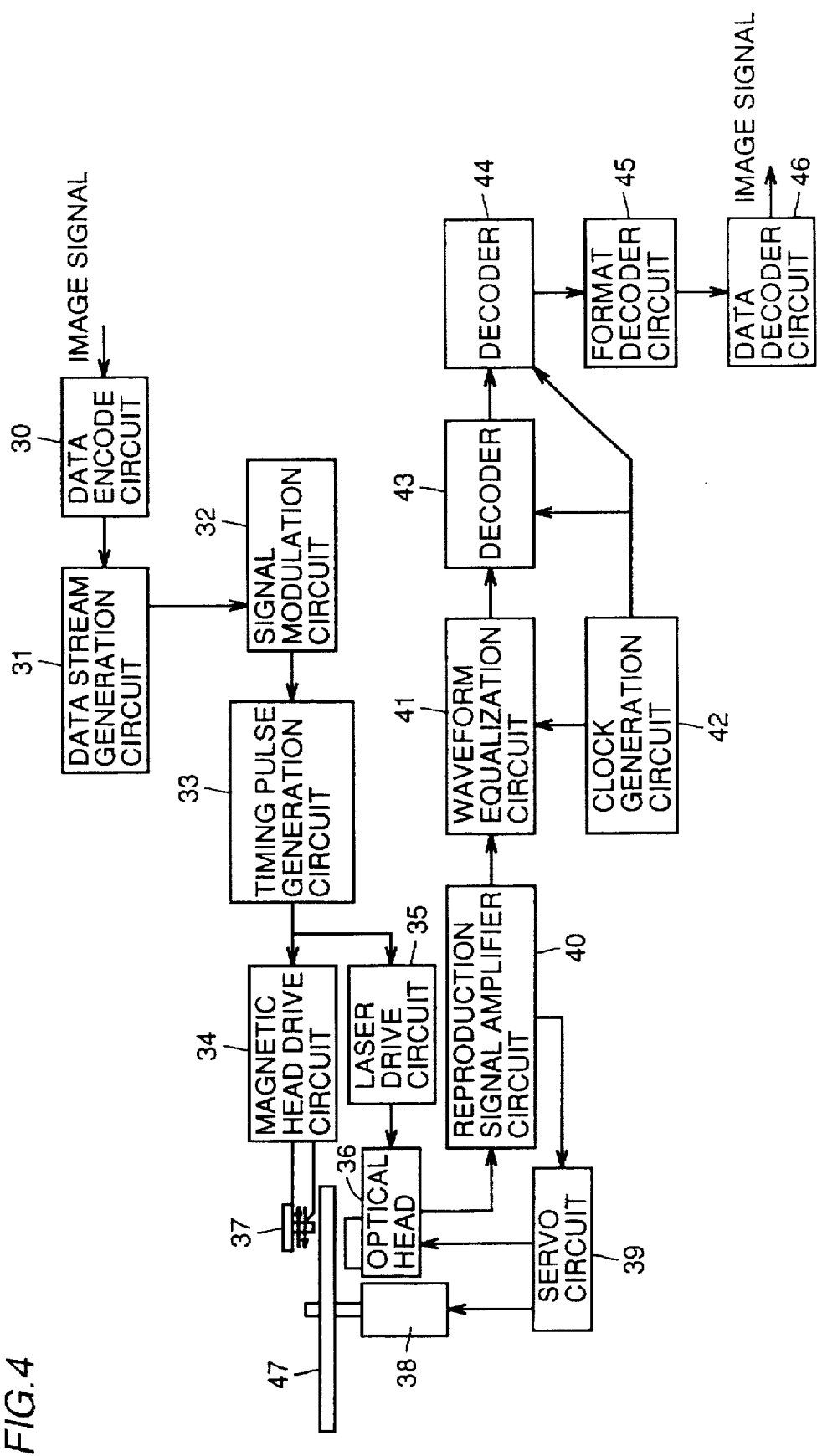
FIG. 4 is a block diagram showing an entire structure of an information recording and reproduction apparatus for a magneto-optical recording medium according to an embodiment of the present invention.

Referring to FIG. 4, the information recording and reproduction apparatus includes a data encode circuit 30, a data stream generation circuit 31, a signal modulation circuit 32, a timing pulse generation circuit 33, a magnetic head drive circuit 34, a laser drive circuit 35, an optical head 36, a magnetic head 37, a spindle motor 38, a servo circuit 39, a reproduction signal amplifier circuit 40, a waveform equalization circuit 41, a clock generation circuit 42, decoders 43, 44, a format decoder circuit 45, and a data decode circuit 46.

A recording operation of the recording and reproduction apparatus of FIG. 4 will first be described. An image signal indicating information to be recorded is applied to data encode circuit 30 to be compressed by a data compression technique such as the MPEG (Motion Picture Expert Group) method and the like. Then, in data stream generation circuit 31, administration information such as reproduction time, elapse time, address, error correction code, and the like are applied to the compressed signal.

The data with the administration information added is supplied to signal modulation circuit 32 to be modulated by, for example, the 1–7 RLL method. Following modulation by the 1–7 RLL method, data is supplied to timing pulse generation circuit 33 to be modified into a pulse signal having a predetermined duty ratio. The data is also adapted to have a predetermined phase difference. Then, the pulse signal is supplied to magnetic head drive circuit 34 and laser drive circuit 35.

Laser drive circuit 35 responds to the supplied pulse signal to turn on/off a semiconductor laser (not shown) in optical head 36. The pulsive laser beam is emitted to a magnetic multilayer film structure formed of a recording layer and a reproduction layer (referred to as "recording plane" hereinafter) of a magneto-optical disk 47 as one of the magnetically induced superresolution magneto-optical recording medium shown in FIGS. 1–3. Magnetic head drive circuit 34 responds to the applied recording signal to drive magnetic head 37, whereby a recording signal is recorded on magneto-optical disk 47.

In the present embodiment, the phase of the pulse laser beam is behind the phase of the recording magnetic field by 0–60 ns. The duty ratio of the pulse laser beam is 20–60%. It is to be noted that the information to be recorded is not limited to an image signal, and an audio signal, data signal, and the like can be used.

Next, a reproduction operation of the recording and reproduction apparatus of FIG. 4 will be described.

A laser beam of 600–700 nm is emitted from a semiconductor laser (not shown) in optical head 36. The laser beam passes through an objective lens (not shown) having a numerical aperture of 0.45–0.65 in optical head 3 to be directed on a recording plane of magneto-optical disk 47. Reflected light from the recording plane is detected by a photo detector (not shown) in head 36, whereby reproduction signal RF is obtained from optical head 36.

The obtained reproduction signal is provided to reproduction signal amplifier circuit 40 to be amplified. The amplified signal is provided to waveform equalization circuit 41 to have its waveform equalized. Also, a clock signal is separated by clock generation circuit 42.

The reproduction signal having its waveform equalized is provided to decoders 43 and 44 to be decoded by the 1–7 method in synchronization with the clock signal from clock generation circuit 42. In format decoder circuit 45, only the data portion is extracted. Decompression is carried out at decoder circuit 46. As a result, an image signal is output.

The reproduction signal amplifier circuit 40 also supplies data to servo circuit 39 in addition to amplification of the reproduced signal. Servo circuit 39 controls optical head 36 and spindle motor 38 so that data is read out from magneto-optical disk 47.

A first embodiment of optical head 36 of the information recording and reproduction apparatus of FIG. 4, which is the optical system used in common for both recording and reproduction of information in the present invention, will be described hereinafter with reference to FIG. 5.

Figure 5:
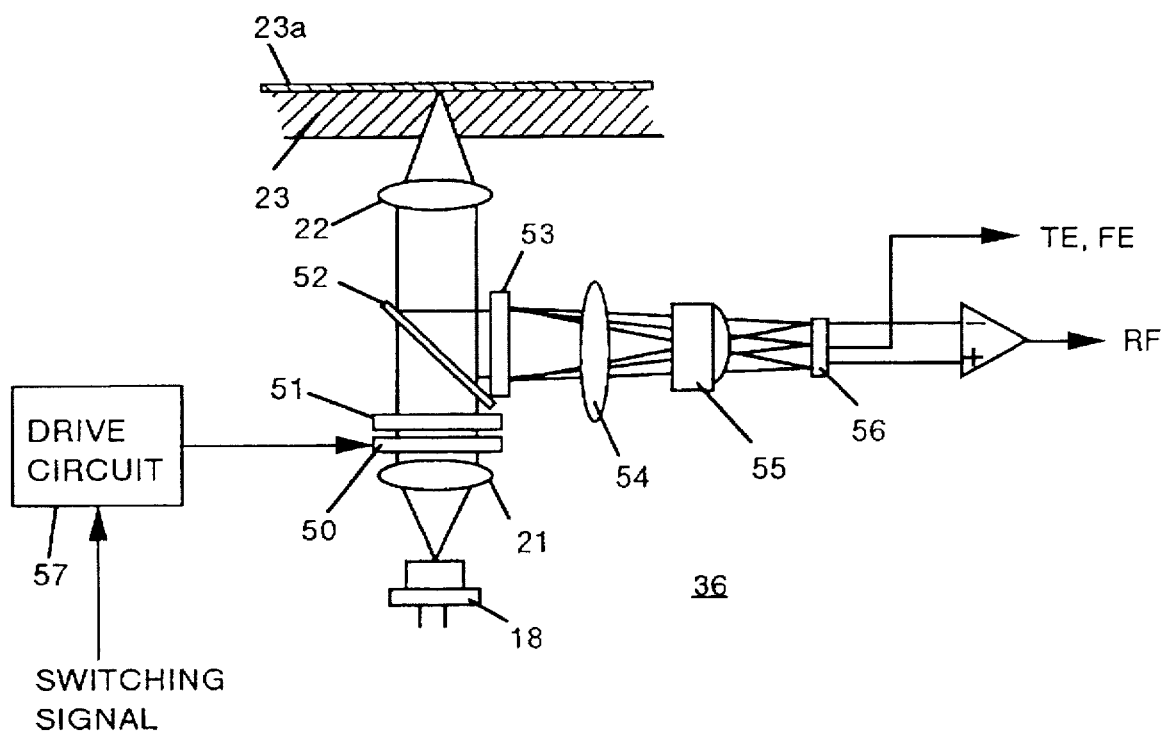
FIG. 5 shows a structure of an optical head according to a first embodiment of the present invention.

In optical head 36 of FIG. 5, a laser beam having a wavelength of 635 nm (tolerable error ±15 nm) generated from semiconductor laser source 18 is rendered parallel by collimate lens 21, and passes through polarization plane rotary unit 50, polarizing filter 51, and a half mirror 52 to enter objective lens 22. The laser beam is collected by objective lens 22 to be directed onto a recording plane 23a through a substrate 23 of the disk which is a magnetically induced superresolution magneto-optical recording medium.

The laser beam reflected at recording plane 23a returns to half mirror 52 passing through substrate 23 and objective lens 22. Half of the laser beam passes through half mirror 52 and the remaining half is reflected therefrom. The laser beam reflected at half mirror 52 passes through a Wollaston prism 53, a collection lens 54, and a cylindrical lens 55 to enter photo detector 56. Reproduction signal RF, tracking error signal TE, and focus error signal FE are detected by photo detector 56. In the first embodiment, the wavelength of the laser beam is 400–800 nm, preferably 600–700 nm, and more preferably 620–650 nm.

Figure 6:
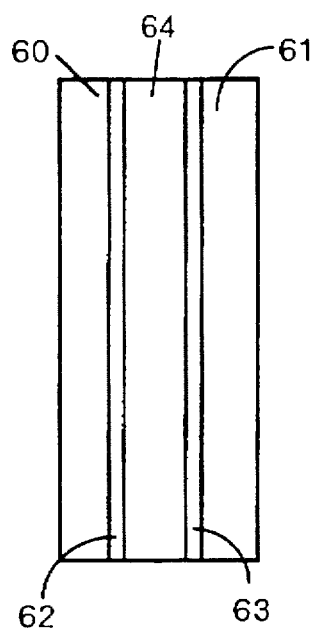
FIG. 6 is a side view of a structure of a polarization plane rotary unit of the optical head of FIG. 5.

Polarization plane rotary unit 50 includes transparent glass plates 60 and 61, transparent electrodes 62 and 63 such as of ITO formed on respective inner surfaces of glass plates 60 and 61, and a TN (twisted nematic) liquid crystal 64, as shown in FIG. 6.

When voltage is not applied from drive circuit 57 to transparent electrodes 62 and 63, the laser beam entering polarization plane rotary unit 50 has the plane of polarization rotated 90° by TN liquid crystal 64 and then emitted therefrom. When voltage is applied to transparent electrodes 62 and 63 from drive circuit 57, the laser beam entering polarization plane rotary unit 50 is passed through without having the plane of polarization rotated.

Figure 7A:
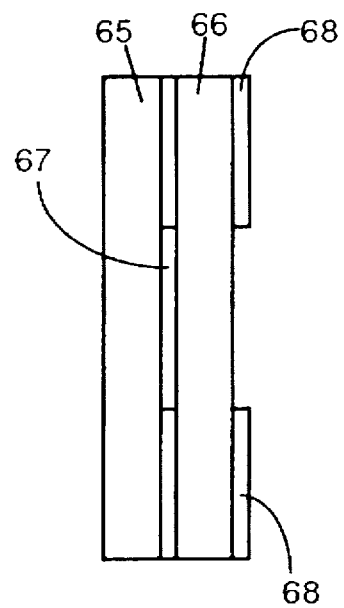
FIG. 7A is a side view showing a structure of a polarizing filter of the optical head of FIG. 5.
Figure 7B:
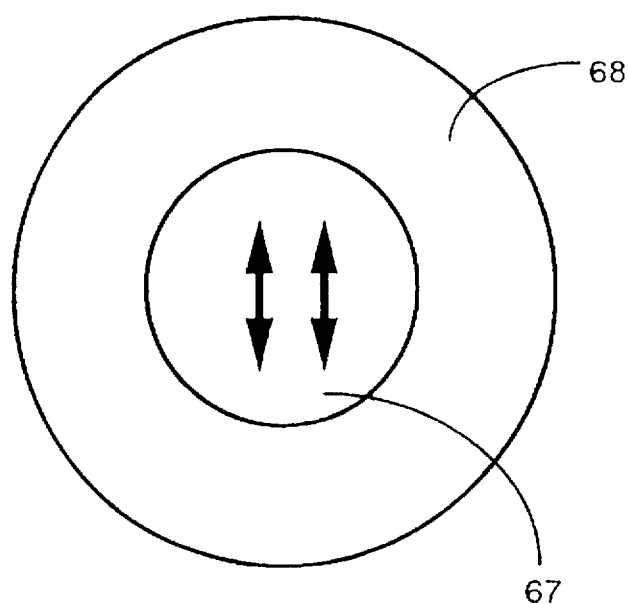
FIG. 7B is a schematic diagram showing the characteristics of the polarizing filter of FIG. 7A.

As shown in FIGS. 7A and 7B, polarizing filter 51 includes transparent glass plates 65 and 66, a polarizing film 67 sandwiched between glass plates 65 and 66, and a transmissive film 68 attached to the outer surface of one glass plate 66.

Polarizing film 67 is provided at the center portion of glass plates 65 and 66. Polarizing film 67 causes only the laser beam that is polarized in a particular direction, i.e. in the vertical direction to pass therethrough. The transmittance thereof is 70–90%. Therefore, the collective characteristics in recording onto the superresolution magneto-optical disk will be degraded unless the transmittance at the outer portion of polarizing film 51 is lowered to a level identical to the transmittance at the inner portion. For this purpose, a transmissive filter 68 having a transmittance of approximately 70–90% is attached on the outer portion of glass plate 66. The material of glass plates 65 and 66 is arbitrary as long as it is transparent and has superior optical characteristics. Resin such as polycarbonate, PMMA, and the like may be used.

The polarization characteristics of polarizing filter 51 is shown in FIG. 7B. At the inner portion of polarizing filter 51, approximately 70–90% of only the laser beam that is polarized in the vertical direction in the drawing by polarizing film 67 is transmitted. At the outer portion, the laser beam is transmitted irrespective of the direction of polarization of the laser beam at a transmittance of approximately 70–90% which is identical to that of the inner region.

The diameter of polarizing film 67 is determined so that the beam diameter of the main lobe by optical superresolution is 0.7–1.1 μm when the numerical aperture NA of objective lens 22 is 0.55 (tolerable error ±1) and the diameter of the effective luminance flux is 4 mm. When the effective luminance flux is not 4 mm, the diameter of polarizing film 67 is determined in proportion to the diameter of the effective luminance flux so that the beam diameter of the main lobe is 0.7–1.1 μm.

Figure 8:
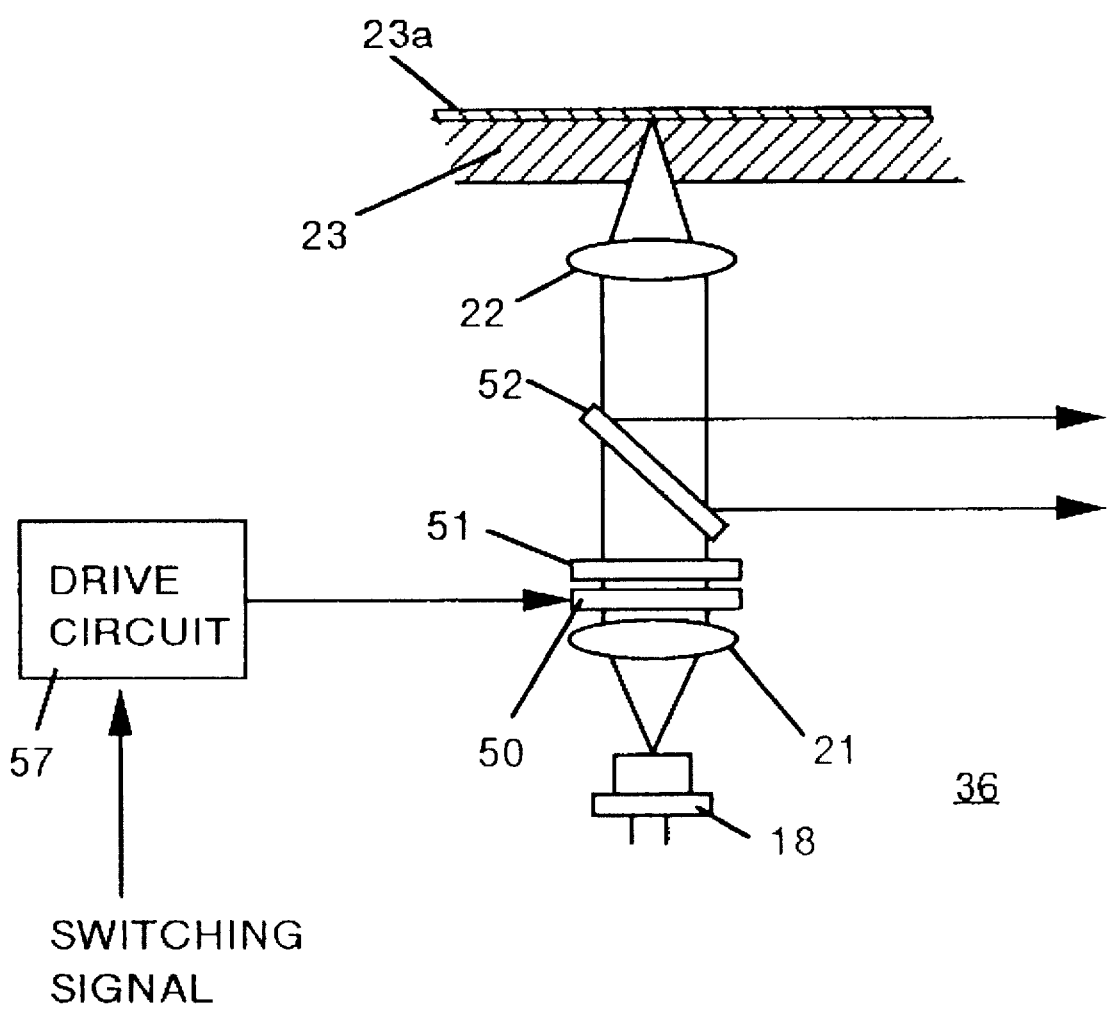
FIG. 8 is a diagram for describing a recording operation of the optical head of FIG. 5.

A recording operation of the recording and reproduction apparatus by the optical head of the first embodiment will be described with reference to FIG. 8 hereinafter. No voltage is applied to polarization plane rotary unit 50 when a signal is to be recorded on a magneto-optical disk. Therefore, the laser beam emitted from collimate lens 21 polarized in a direction perpendicular to the paper plane of the drawing has its plane of polarization rotated entirely by 90° by polarization plane rotary unit 50 and is transmitted through polarizing filter 51. Therefore, a laser beam that is polarized in a direction parallel to the paper plane of the drawing is emitted from polarization plane rotary unit 50.

Since polarizing film 67 of polarizing filter 51 has a polarization characteristics that provides polarization in a direction parallel to the paper plane, the laser beam entering polarizing filter 51 will not be blocked thereat and is entirely transmitted. The transmitted laser beam enters objective lens 22 via half mirror 52 to further pass through substrate 23 to be directed on recording plane 23a of magneto-optical recording magneto-optical disk 47. Thus, information is recorded. The spot diameter of the laser beam formed on recording plane 23a is 1.1 μm.

As shown in FIG. 9A, the polarity of the applied magnetic field in recording changes, and the laser beam is provided in a pulsive manner as shown in FIG. 9B. Therefore, the laser beam is emitted twice onto magneto-optical disk 47 during one application of a positive or negative magnetic field to magneto-optical disk 47. Therefore, a recording domain exceeding the Curie temperature is formed as shown in FIG. 9C.

The other operations are already described with reference to FIG. 5, and will not be repeated here. The signal to be recorded has been NRZI(Non Return Zero Inverse)- modulated.

Figure 10:
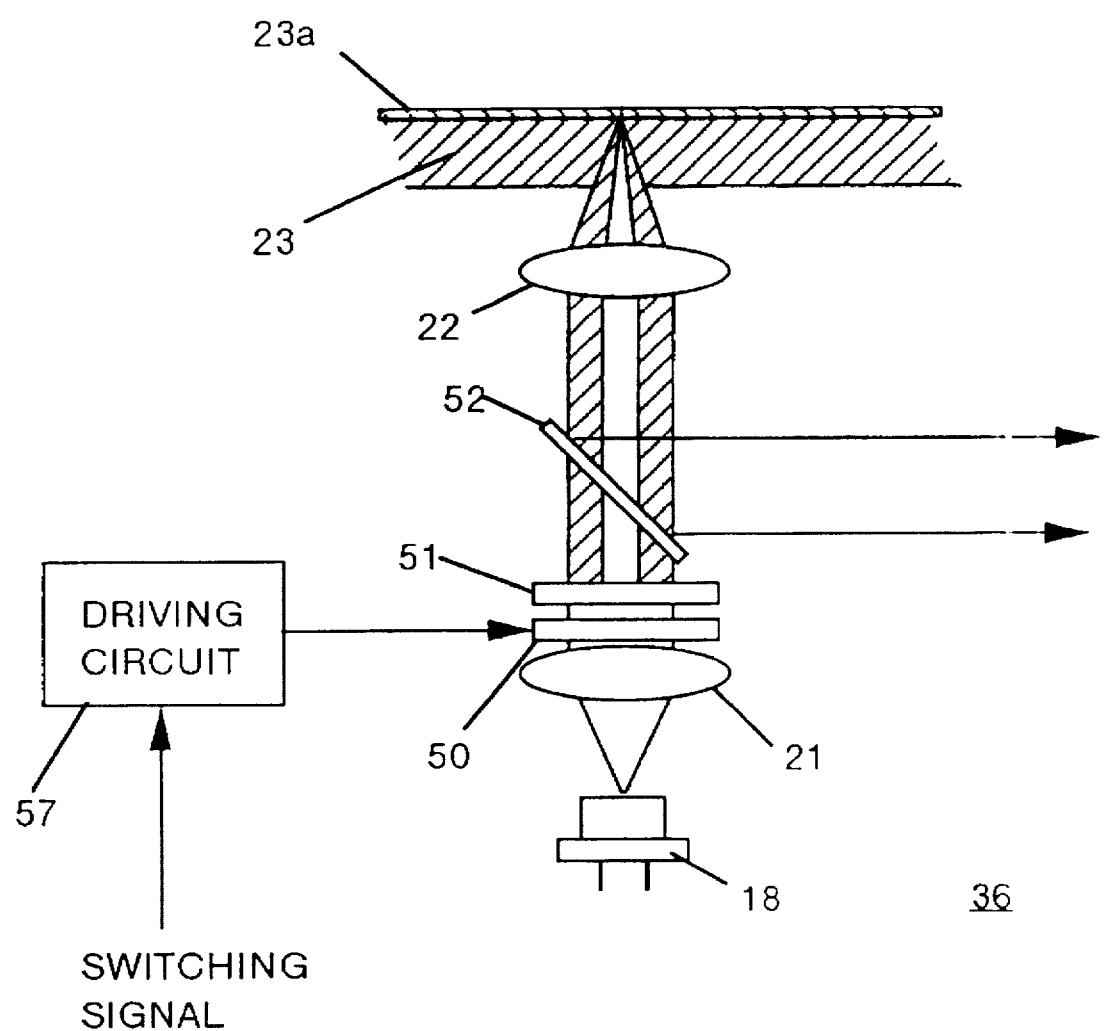
FIG. 10 is a diagram for describing a reproduction operation of the optical head of FIG. 5.

A reproduction operation of the above-described recording and reproduction apparatus will be described hereinafter with reference to FIG. 10. When a signal is reproduced from magneto-optical disk 47, voltage is applied to polarization plane rotary unit 50. As a result, a laser beam from collimate lens 21 that is polarized in a direction perpendicular to the paper plane passes through polarization plane rotary unit 50 without having its plane of polarization rotated, and then enters polarizing filter 51. Since polarizing film 67 of polarizing filter 51 passes through only a laser beam that is polarized in a direction parallel to the paper plane, the laser beam has its inner portion blocked by polarizing filter 51, and only the outer portion thereof is passed through. The laser beam of an annular configuration output from polarizing filter 51 passes through half mirror 52 to enter objective lens 22. The laser beam further passes through substrate 23 to be emitted onto recording plane 23a of magneto-optical disk 47. The laser beam emitted on recording plane 23a forms side lobes in addition to a main lobe. The main lobe has a beam diameter of 0.9 μm, which is smaller than the beam diameter of the above-described recording mode. The other operations are already described with reference to FIG. 5, and will not be repeated here.

A second embodiment of optical head 36 of the information recording and reproduction apparatus of FIG. 4 will be described hereinafter. The entire structure of the optical head of the second embodiment will not be illustrated since it is similar to that of the first embodiment shown in FIG. 6.

Figure 11A:
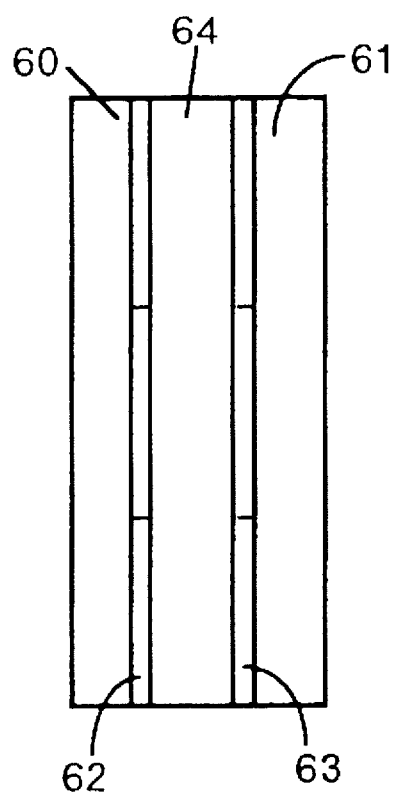
FIG. 11A is a side view showing a structure of a polarization plane rotary unit of an optical head according to a second embodiment of the present invention.
Figure 11B:
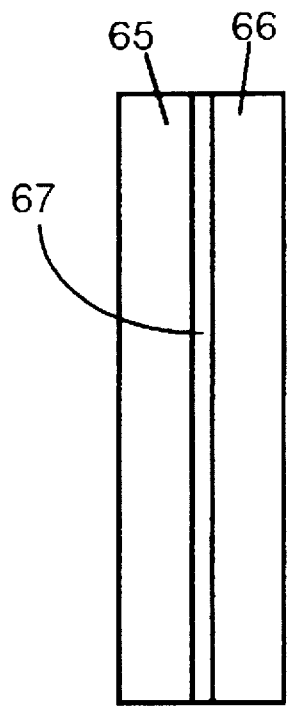
FIG. 11B is a side view showing a structure of a polarizing filter of the optical head according to a second embodiment of the present invention.
Figure 12A:
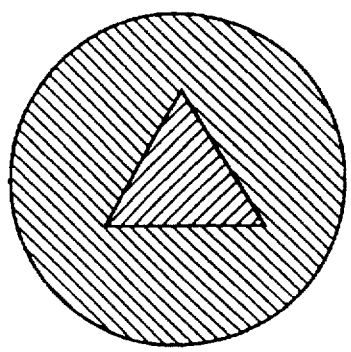
FIGS. 12A–12G schematically show various configurations of a light blocking body formed in a light path of a laser beam according to each embodiment of the present invention.
Figure 12E:
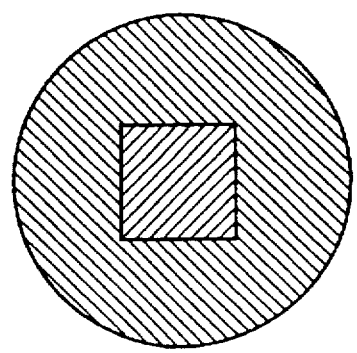
Figure 12B:
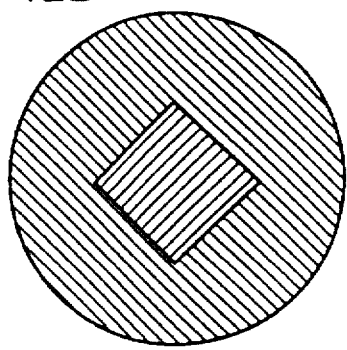
Figure 12F:
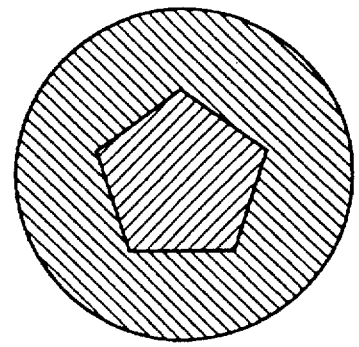
Figure 12C:
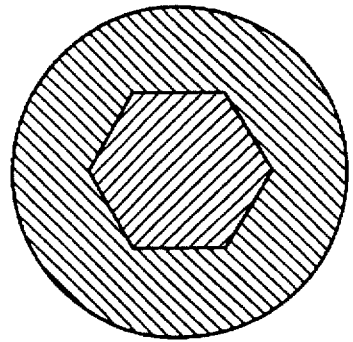
Figure 12G:
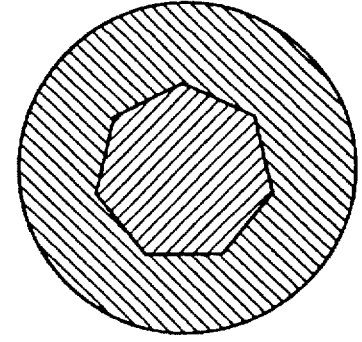
Figure 12D:
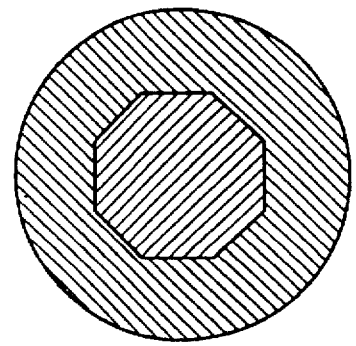

In contrast to the first embodiment in which the plane of polarization of the laser beam is entirely rotated by polarization plane rotary unit 50, and in which polarizing film 67 is provided at the center of the laser beam in polarizing filter 51, the second embodiment has each of the transparent electrodes of the polarization plane rotary unit 50 patterned into an inner portion and an outer portion separately, and has the polarizing film attached all over the polarizing filter 51, as shown in FIGS. 11A and 11B, respectively. In the polarization plane rotary unit 50 of the second embodiment, individual voltages can be applied to the transparent electrodes of the inner portion and the transparent electrodes of the outer portion, separately.

In recording a signal onto magneto-optical disk 47, the entire plane of polarization of the laser beam is rotated 90° since voltage is neither applied to the transparent electrodes of the inner portion nor the outer portion. The polarizing film attached all over the polarizing filter provides polarization in a direction parallel to the direction of polarization of the rotated plane of polarization. Therefore, the laser beam is wholly transmitted through the polarizing filter to be emitted on recording plane 23a of magneto-optical disk 47.

When a signal is to be reproduced from magneto-optical disk 47, voltage is applied only to the transparent electrodes of the inner portion. No voltage is applied to the transparent electrodes of the outer portion. Therefore, the center portion of the laser beam passes through polarization plane rotary unit 50 without having its plane of polarization rotated 900. The outer portion of the laser beam has its plane of polarization rotated 90° to pass through polarization plane rotary unit 50. The outer portion of the laser beam that has its plane of polarization rotated passes through the polarizing filter, whereas the inner portion of the laser beam that does not have its plane of polarization rotated is blocked by polarizing filter 51. Therefore, a laser beam of an annular configuration is emitted from polarizing filter 51 to enter objective lens 22 via half mirror 52. The laser beam through objective lens 22 is emitted onto a recording plane of the magneto-optical disk.

Although polarization plane rotary unit 50 and polarizing filter 51 are located between collimate lens 21 and half mirror 52 in the first and second embodiments, the position is arbitrary as long as they are placed between semiconductor laser source 18 and objective lens 22.

Although a circular polarizing film 67 is attached to polarizing filter 51 in the first embodiment shown in FIG. 7B, polarizing film 67 does not necessarily have to be circular, and may have a polygonal configuration of any of a triangle to an octagon. Also, the inner portion of polarization plane rotary unit 50 of the second embodiment shown in FIG. 11A to which a voltage is applied independently does not necessarily have to be circular and may be polygonal of any of a triangle to an octagon configuration. FIGS. 12A–12G shows various configurations of a light blocking body provided in the light path of a laser beam using polarization plane rotary unit 50 or polarizing filter 51.

Figure 13A:
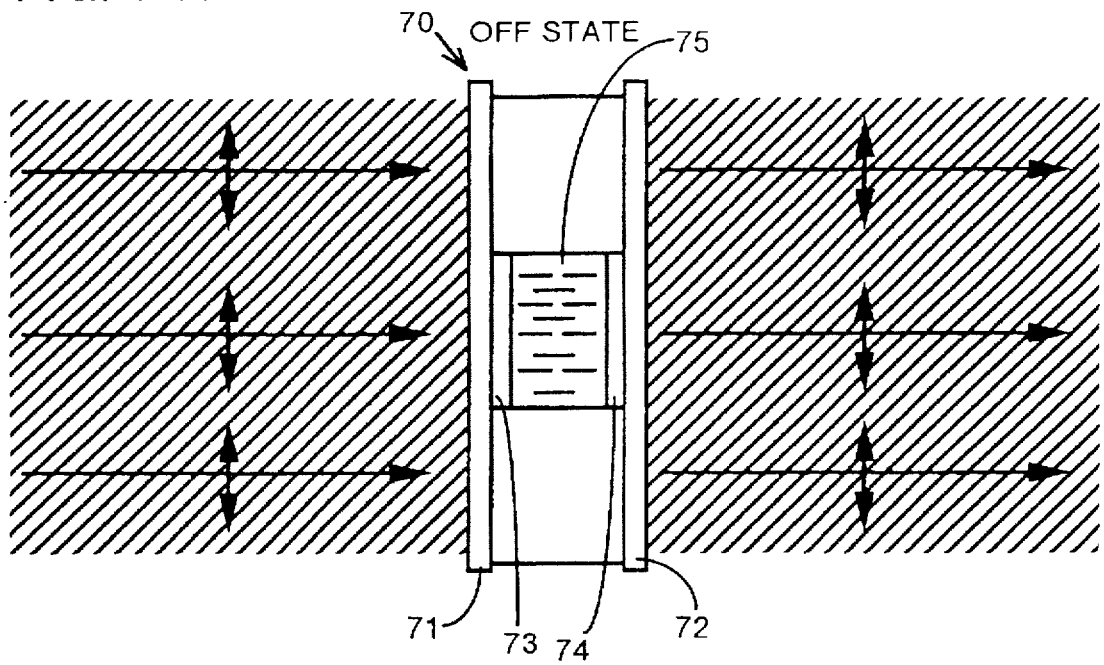
FIGS. 13A and 13B are diagrams for describing an operation of a liquid crystal shutter as an alternative to the polarization plane rotary unit and polarizing filter of FIG. 5.
Figure 13B:
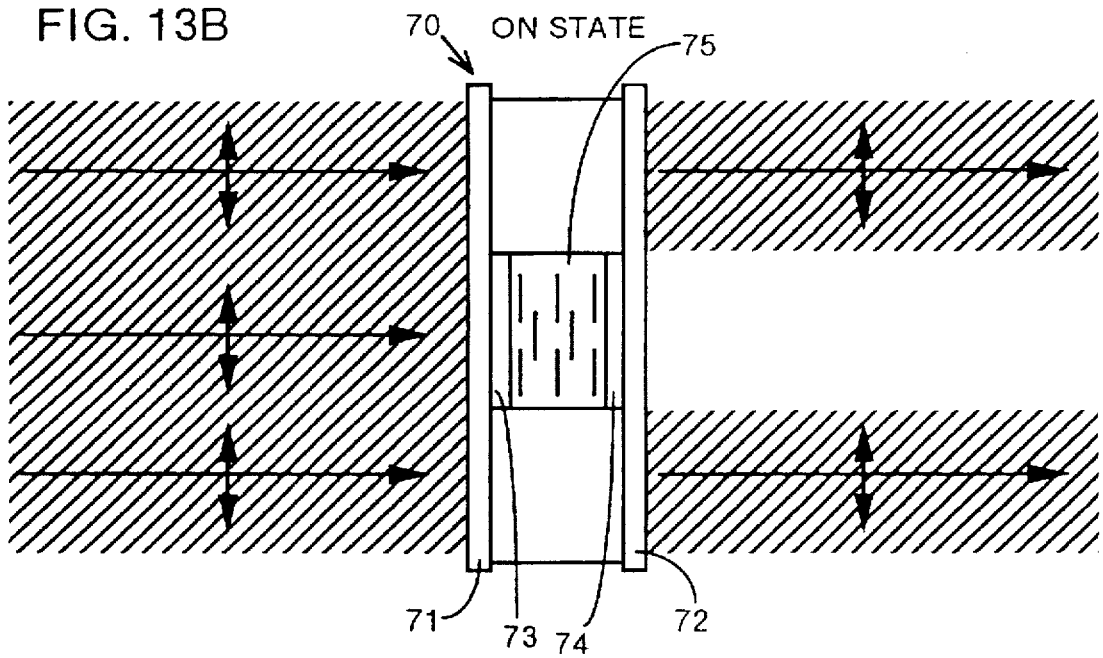

A liquid crystal shutter 70 as shown in FIGS. 13A and 13B can be used instead of polarization plane rotary unit 50 and polarizing filter 51 of the first and second embodiments. Liquid crystal shutter 70 includes transparent glass plates 71 and 72, transparent electrodes 73 and 74 formed of ITO and the like at respective inner surfaces at the center of glass plates 71 and 72, and a guest-host type liquid crystal 75 sandwiched between glass plates 71 and 72.

When voltage is not applied to transparent electrodes 73 and 74 as shown in FIG. 13A, laser beam is entirely passed through liquid crystal shutter 70. When voltage is applied to transparent electrodes 73 and 74 as shown in FIG. 13B, only the inner portion of the laser beam is transmitted through liquid crystal shutter 70, and the outer portion of the laser beam is blocked by liquid crystal shutter 70.

Figure 14A:
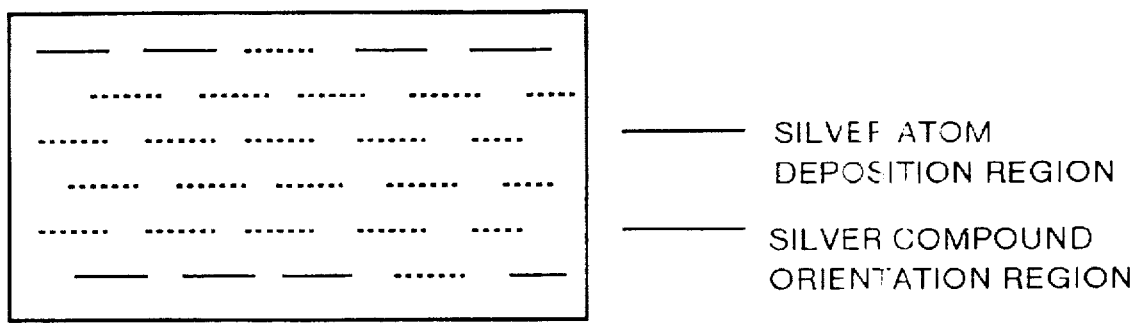
FIGS. 14A and 14B are front views of a glass polarizer as an alternative to the polarizing filter shown in FIGS. 7A and 7B.
Figure 14B:
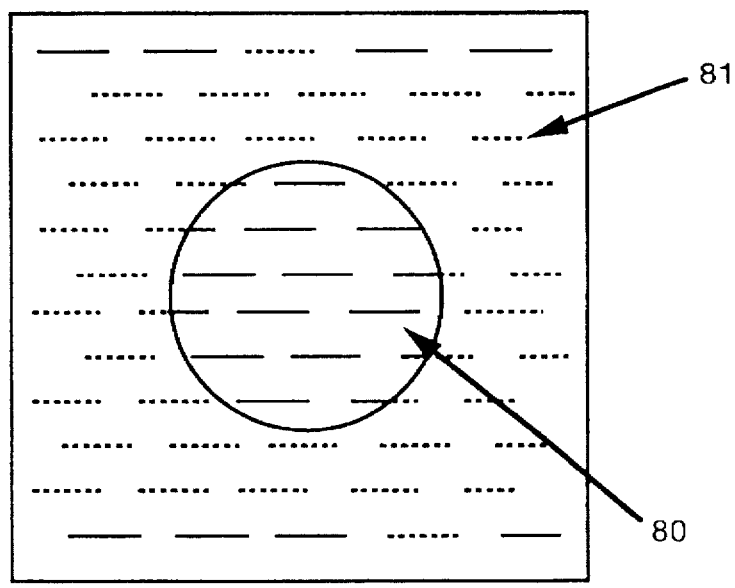

Furthermore, a polarization selective hologram or a glass polarizer as shown in FIGS. 14A and 14B can be used instead of polarizing filter 51 of FIGS. 7A and 7B in the first embodiment. Also, instead of polarizing filter 51 of FIGS. 7A and 7B of the first embodiment, an optical thin film having polarization selectivity can be formed on any optical material, for example on the surface of half mirror 52, located between polarization plane rotary unit 50 and objective lens 22. Such a glass polarizer is disclosed in "Polarcor/ Glass Polarizers for Near-Infrared", Ceramics Vol. 29, No. 9, pp. 838–839, 1994, by T. Kawaguchi.

A glass polarizer is fabricated by arranging silver compound in a predetermined direction in glass as shown in FIG. 14A, and reducing the surface to deposit silver. The reduced silver film has polarization characteristics. Therefore, in the glass polarizer used as an alternative to polarizing filter 51, only the silver at the center portion 80 is deposited, and the silver at the peripheral portion 81 is not deposited as shown in FIG. 14B. Therefore, center portion 80 of the glass polarizer has polarization characteristics while the peripheral portion 81 does not have polarization characteristics.

Since the above-described glass polarizer employs silver, a laser beam having a plane of polarization identical to that of center portion 80 can be transmitted 100% through center portion 80. It is therefore not necessary to attach a transmissive film 68 to reduce the transmittance at the peripheral portion as in FIGS. 7A and 7B. Sufficient amount of light can be achieved even when the luminance flux of the laser beam is reduced. Although it is desirable to use silver as the material to provide such polarization characteristics to the glass polarizer, any other metal material can be used as long as it provides polarization characteristics.

In the first and second embodiments, TN type liquid crystal 64 is used to rotate the plane of polarization electrically. Alternatively, a STN (super twisted nematic) liquid crystal or a ferroelectric type liquid crystal can be used. When a positive voltage is applied for short time period, the ferroelectric type liquid crystal causes the plane of polarization of the laser beam to be rotated 45° and maintains that state. When a negative voltage is applied for short time period, the ferroelectric type liquid crystal causes the plane of polarization of the laser beam to be rotated 45° in a direction opposite to that of positive voltage application and maintains that state. Therefore, by applying a positive voltage in reproduction and a negative voltage in recording, the ferroelectric liquid crystal can cause the plane of polarization of the laser beam to be rotated 90°. Usage of such a ferroelectric type liquid crystal is advantageous in that the time of applying a voltage to rotate the plane of polarization is shortened to reduce power consumption.

Figure 15:
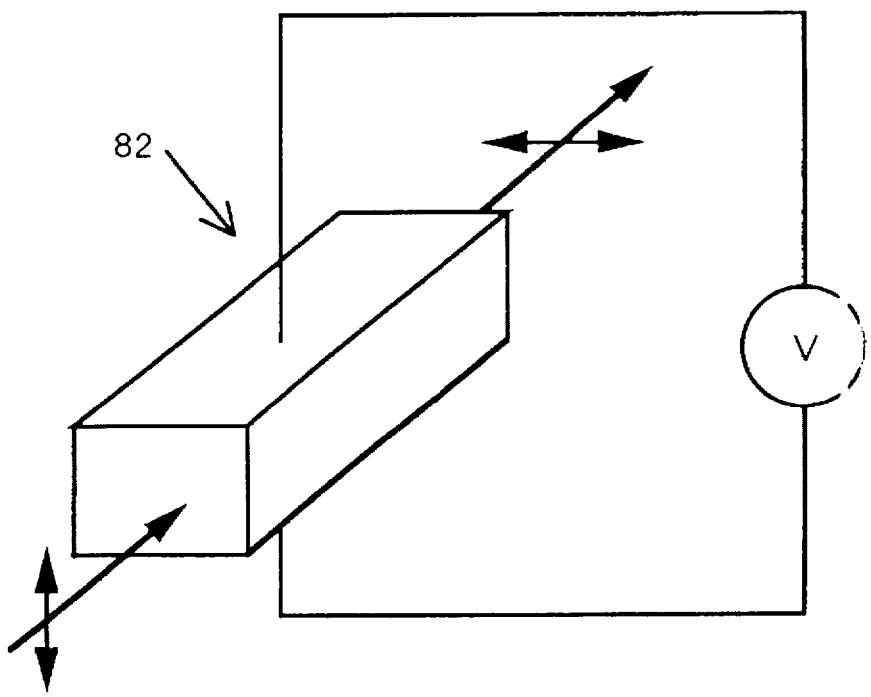
FIG. 15 is a diagram for describing the operation principle of a Pockels cell as an alternative to the TN type liquid crystal shown in FIG. 6.

A Pockels cell 82 as shown in FIG. 15 can be used instead of TN type liquid crystal 64 in the first and second embodiments. When a predetermined voltage is applied, Pockels cell 82 polarizes the laser beam having a plane of polarization in a vertical direction in the same drawing into a laser beam having a plane of a polarization in the horizontal direction in the same drawing. Since the rotating angle of the plane of polarization can be altered by adjusting the applied voltage, the rotating angle of the plane of the polarization can be adjusted so as to obtain the optimum recording and reproduction characteristics.

Figure 16:
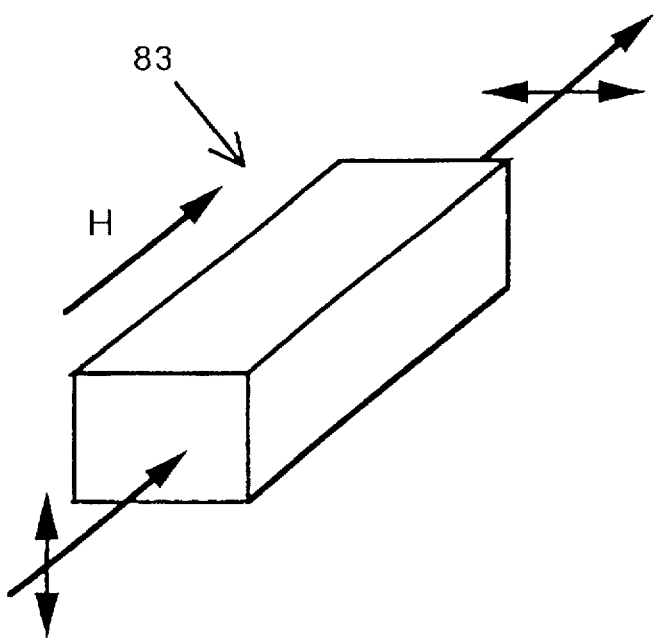
FIG. 16 is a diagram for describing the operation principle of a Faraday cell as an alternative to the TN type liquid crystal shown in FIG. 6.

A Faraday element 83 that rotates the plane of polarization magnetically as shown in FIG. 16 can be used instead of TN type liquid crystal 64 of the first and second embodiments. When a magnetic field H is applied, Faraday element 83 rotates the plane of polarization of the laser beam 90°. Since the direction of passage of the laser beam matches the direction of applying magnetic field H in Faraday element 83, a coil is wound around the tube that supports Faraday element 83. This simplifies the assembly and structure of Faraday element 83.

Figure 17:
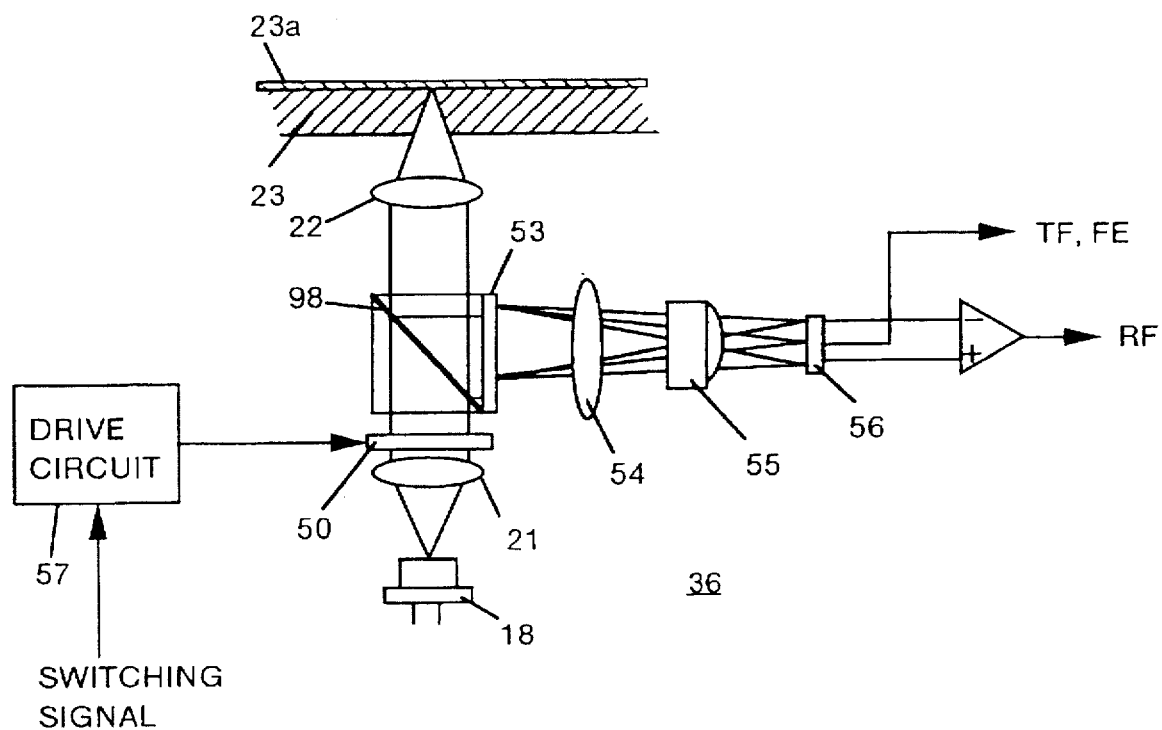
FIG. 17 is a block diagram showing the case where a polarization beam splitter is used as an alternative to the polarizing filter in the second embodiment of the present invention.

In the above-described second embodiment, a polarization beam splitter can be used instead of a polarizing filter. FIG. 17 is a block diagram showing a structure of blocking the inner portion of a laser beam by a combination of a polarization plane rotary unit 50 such as shown in FIG. 11 and a polarization beam splitter 98. Referring to the structure of FIG. 17, the plane of polarization of the laser beam is entirely rotated 90° by the polarization plane rotary unit to become parallel to the paper plane, so that the laser beam is entirely passed through the polarization beam splitter 98 in a recording mode. In a reproduction mode, the plane of a polarization is not rotated at the inner portion, and the plane of a polarization is rotated 90° at the outer portion by the polarization plane rotary unit 50. Therefore, the laser beam has only the inner portion blocked by the polarization beam splitter 98 to enter the objective lens.

Even in the case where an optical superresolution method is employed with the inner portion of the laser beam blocked only at the time of reproduction as described above, there is a possibility that information adjacent to the proper information to be reproduced is erroneously reproduced to degrade the reproduction characteristics if the intensity of the side lobes is too great. Particularly in the side lobe position behind the main lobe, there is a possibility that the temperature is increased by the influence of the temperature rise by the main lobe to result in erroneous reproduction of the information at the side lobe position. However, it is possible to reduce the intensity of the side lobes to effectively remove influence arising from the side lobes in the present invention, as will be described hereinafter, even when the optical superresolution method is applied in the laser beam for reproduction.

Figure 18:
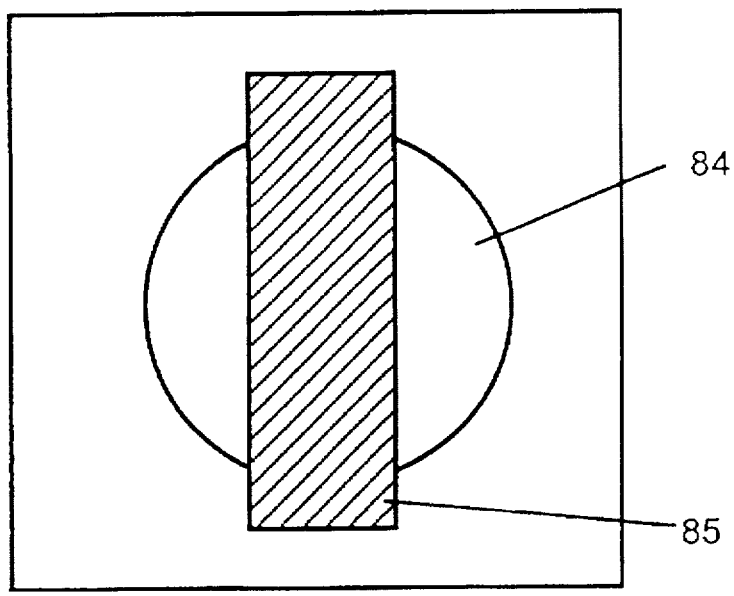
FIGS. 18–20 show the configuration of the bodies for blocking the inner portion of a laser beam in the optical head of FIG. 5.
Figure 19:
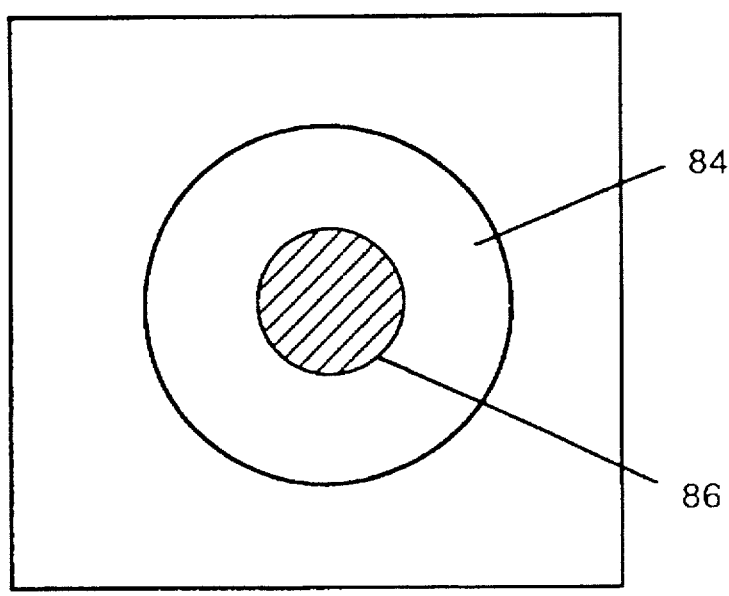
Figure 20:
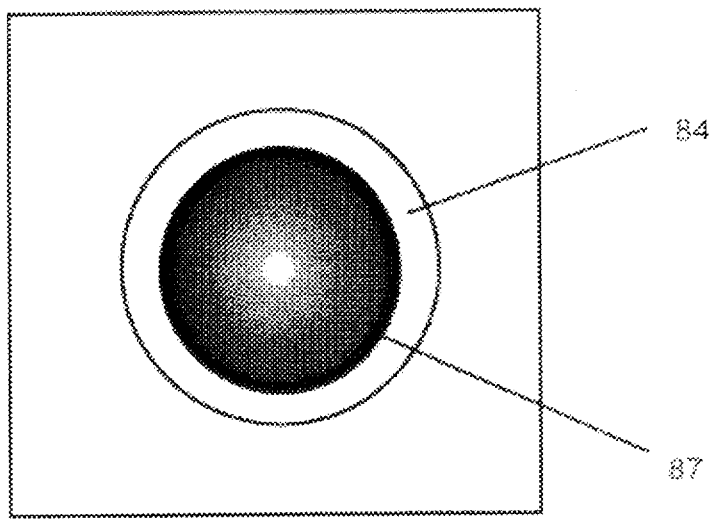

In the above-described first and second embodiments, the configuration of light blocking portion 85 or 86 that blocks the center area of laser beam 84 is preferably rectangular or circular as shown in FIGS. 18 or 19. A light blocking portion 87 as shown in FIG. 20 is also suitable. By this light blocking portion 87, the center point of laser beam 84 is not blocked at all, and the transmittance is gradually reduced from the center point towards the radial direction. In this case, the laser beam emitted on the recording plane of the magneto-optical disk can have a side lobe formed that is sufficiently lower in intensity than the main lobe in comparison to the case where the center point is completely blocked. If the intensity of both side lobes is identical, the beam diameter of the main lobe can further be reduced.

Figure 21:
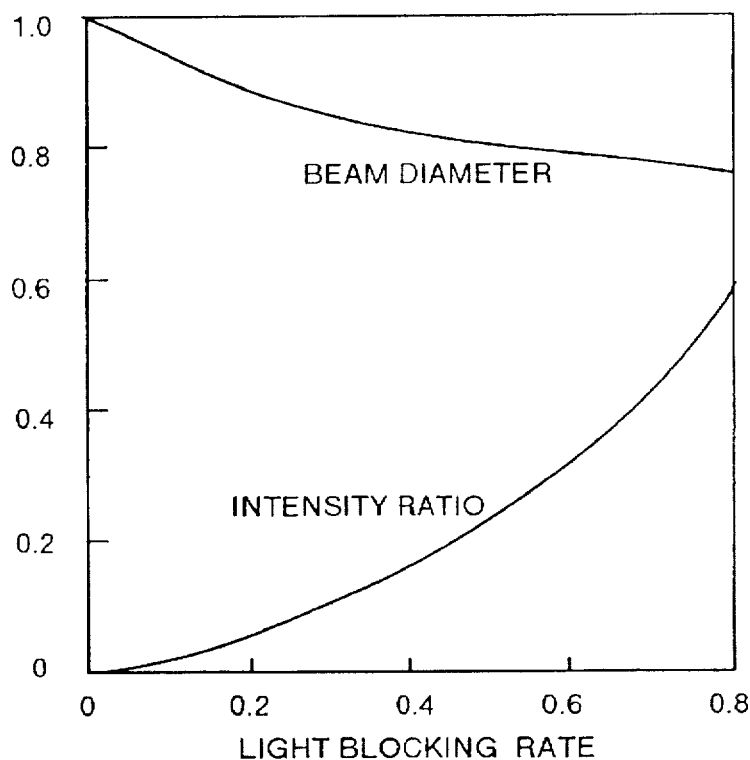
FIG. 21 is a graph showing the relationship between the intensity ratio (side lobe intensity / main lobe intensity; the same applies hereinafter) and the light blocking rate, and the relationship between the beam diameter of the main lobe and the light blocking rate when the circular light blocking body shown in FIG. 19 is used.

As shown in FIG. 21, the intensity ratio is also increased in proportion to increase in transmittance, and the beam diameter of the main lobe is reduced. The intensity ratio is increased only up to the level of 0.6 even when the light blocking rate is 0.8. However, the beam diameter of the main lobe is reduced only to approximately 0.8 in comparison to the case where light is not blocked (where light blocking rate is 0). When light blocking portion 87 is circular as shown in FIG. 19, the light blocking rate is preferably 0.4–0.8.

Figure 22:
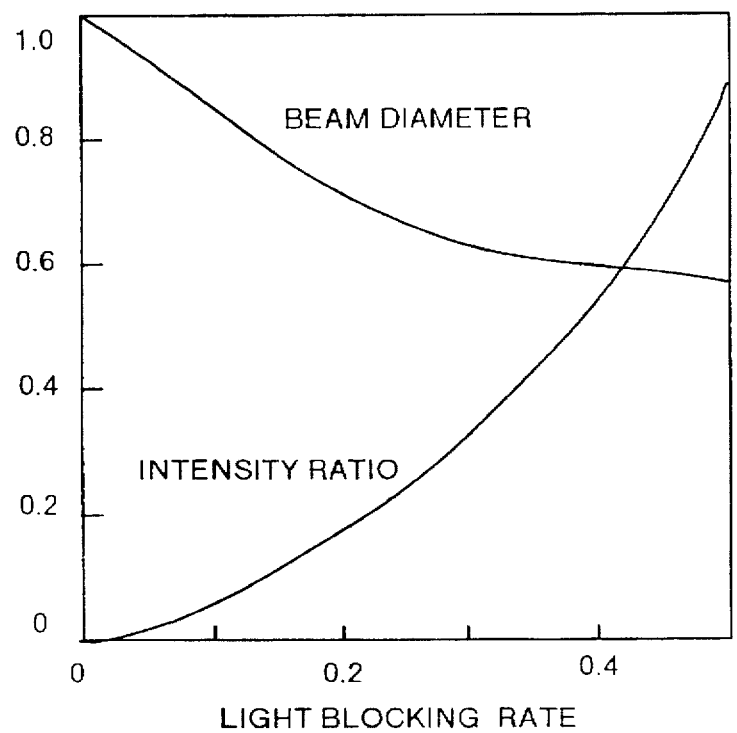
FIG. 22 is a graph showing the relationship between the intensity ratio and the light blocking rate, and the relationship between the beam diameter of the main lobe and the light blocking rate when the rectangular light blocking body shown in FIG. 18 is used.

When the rectangular light blocking portion 85 shown in FIG. 18 is employed, the intensity ratio exceeds 0.5 when the light blocking rate attains approximately 0.4 as shown in FIG. 22. In contrast, the beam diameter of the main lobe can be reduced up to approximately 0.6 in comparison to the case where light is not blocked. Therefore, the light blocking rate is preferably 0.2–0.45 when the light blocking portion 85 has a rectangular configuration.

Figure 23:
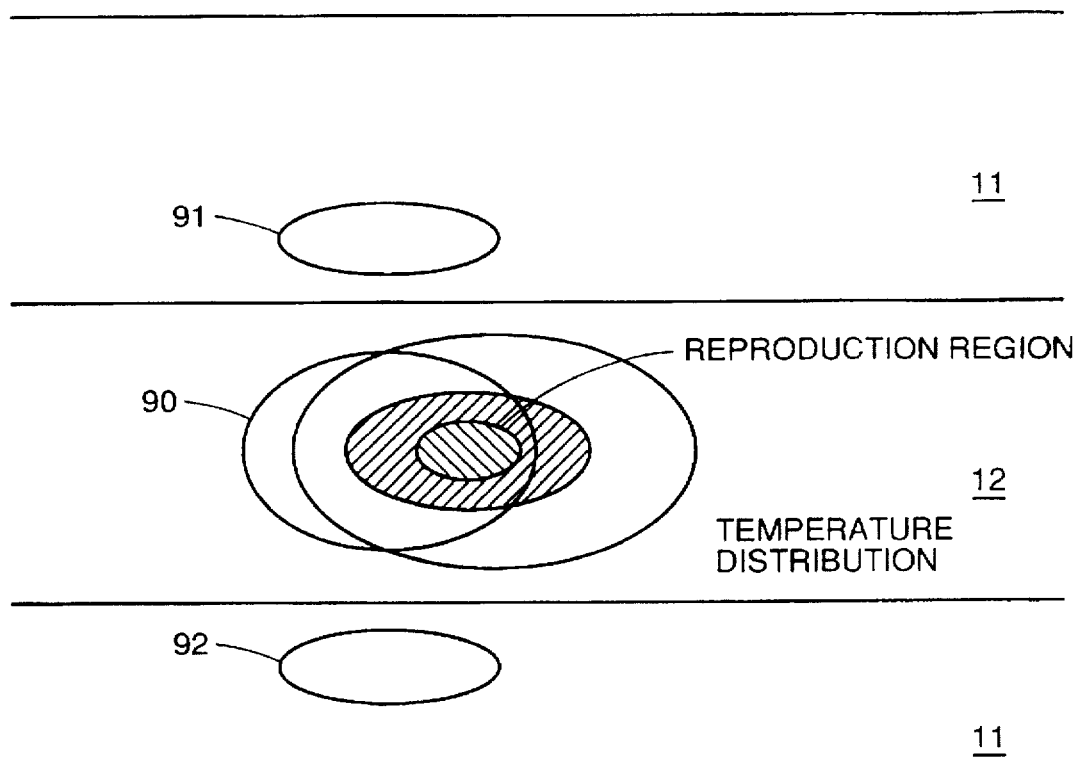
FIGS. 23 and 24 show the state on the magneto-optical disk irradiated with the laser beam spot when the rectangular light blocking body of FIG. 18 and the circular light blocking body of FIG. 19, respectively, are used.

When a signal is to be reproduced from a magneto-optical disk using the rectangular light blocking portion 85 of FIG. 18, the laser beam directed onto the magneto-optical disk forms a main lobe 90 and side lobes 91 and 92 as shown in FIG. 23. Main lobe 90 is emitted within groove 90, whereas the pair of side lobes 91 and 92 are emitted within land 11. When light blocking portion 85 is rectangular, the temperature at the radiated portion of side lobe 91 can be rendered lower than 150° C. which is the Curie temperature by selecting the light blocking rate appropriately. Therefore, a signal cannot be erroneously reproduced from land 11.

In the present embodiment, the light blocking portion is inserted in the tangential direction, whereby the track density is improved without influence of side lobes 91 and 92. The present invention is not limited to this, and the light blocking portion can be inserted in the running direction of the track, whereby the linear density can be improved without influence of the side lobe.

Figure 24:
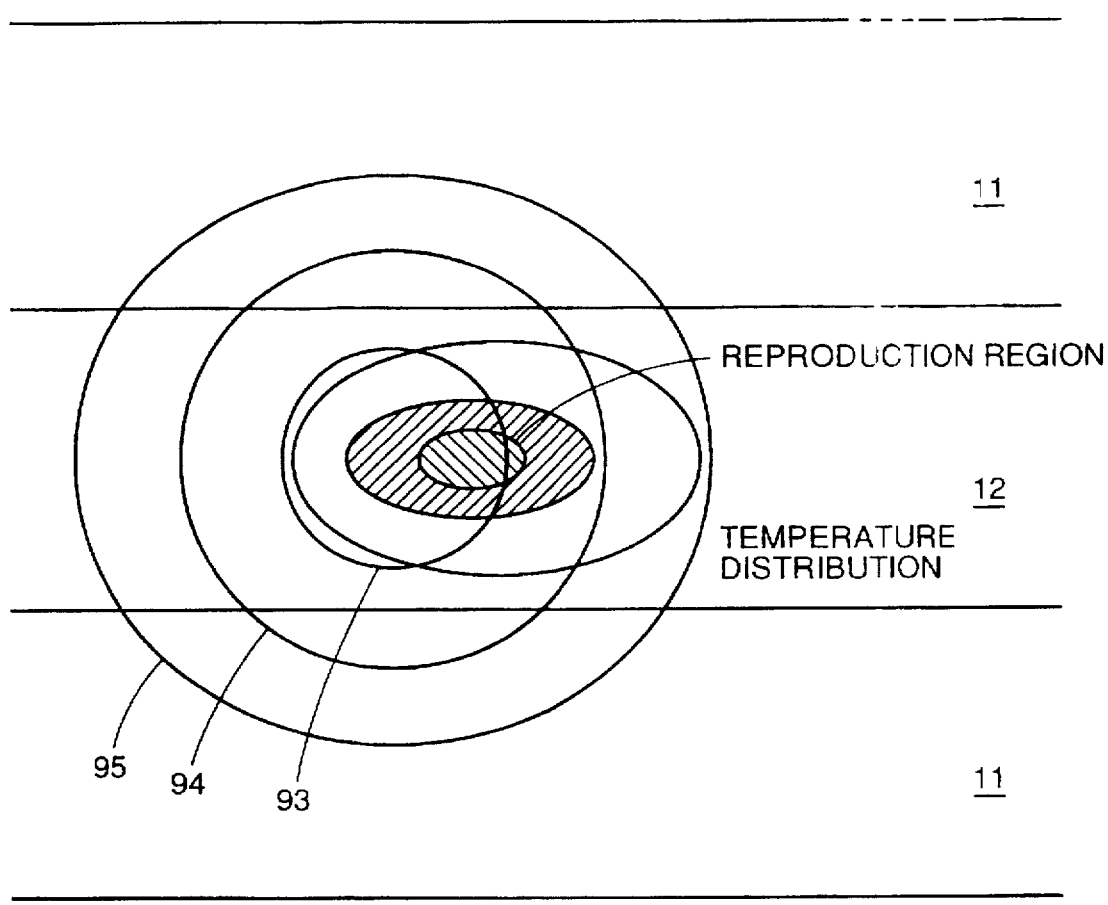

When a signal is to be reproduced from the magneto-optical disk using a circular light blocking portion 86 shown in FIG. 19, the laser beam forms a main lobe 93 and side lobes 94 and 95 concentrically as shown in FIG. 24. When light blocking portion 87 takes a circular configuration, the intensity ratio will become lower than 0.6 if the light blocking rate is lower than 0.4 as shown in FIG. 22. Therefore, the temperature at the radiated portion of the side lobe will not exceed 150° C. Thus, reproduction from land 11 is prevented.

Figure 25:
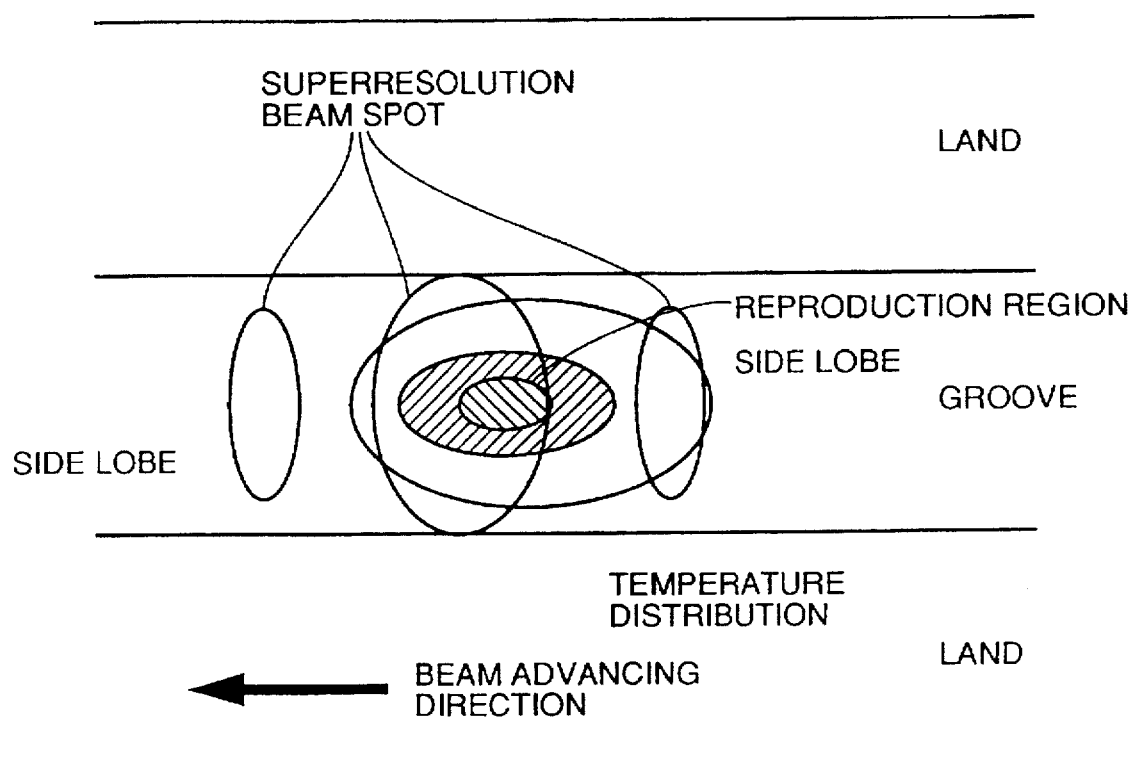
FIG. 25 shows the state on the magneto-optical recording medium irradiated with the laser beam when a rectangular light blocking body is inserted perpendicular to the groove.

The beam spots of radiation of the main lobe and the side lobes on a magneto-optical recording medium will be described hereinafter with reference to FIG. 25 when a rectangular light blocking portion shown in FIG. 18 is inserted into the light path so that the longitudinal direction thereof is perpendicular to the direction of the groove. When the numerical aperture of the objective lens is 0.55 and the wavelength of the laser beam is 685 nm (tolerable error ±15 nm; the same applies hereinafter), for example, a beam diameter of 1.05 μm can be obtained when there is no light blocking body. In contrast, by inserting a rectangular light blocking body having a light blocking rate of 30% in the optical path so that the longitudinal direction is perpendicular to the direction of the groove, the beam diameter of the main lobe in the advancing direction of the beam can be reduced to 0.79 μm. As a result, the linear recording and reproduction density can be increased by more than 20%. Influence by the side lobes generated by the light blocking body is removed as described above.

Figure 26:
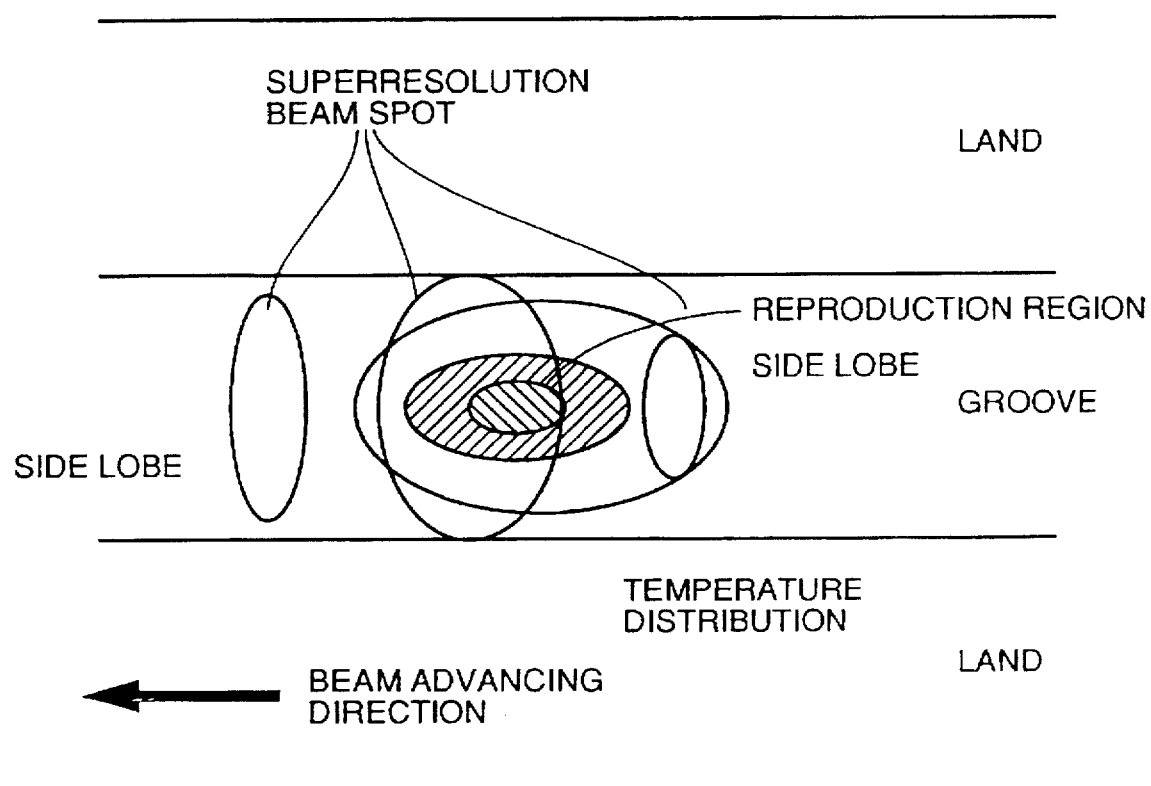
FIG. 26 shows the state on the magneto-optical recording medium irradiated with a beam when a rectangular light blocking body is inserted perpendicular to the groove while being offset from the center of the laser beam.
Figure 30:
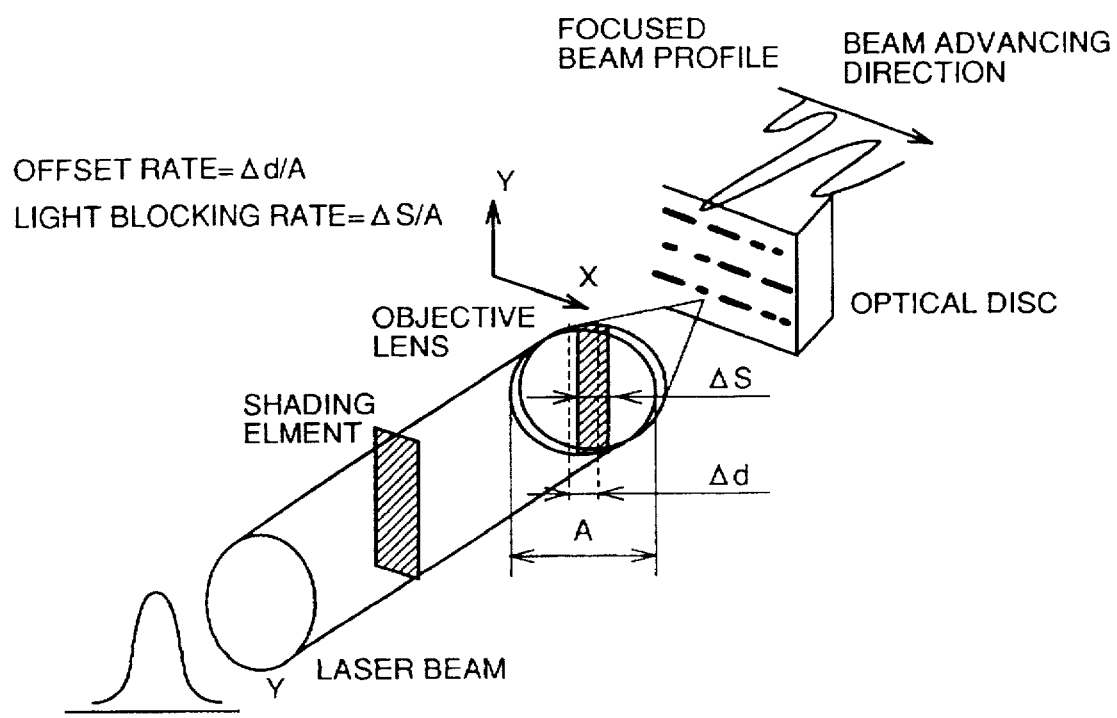
FIG. 30 schematically shows generation of a main lobe and side lobes due to the offset of the rectangular light blocking body from the center of the laser beam.

A case similar to FIG. 25 where a rectangular light blocking body is inserted in a light path so that the longitudinal direction is perpendicular to the direction of the groove, and where the position of the light blocking body is shifted from the center of the beam in the advancing direction of the beam will be described hereinafter with reference to FIG. 26. By shifting the light blocking body from the center of the laser beam, the intensity ratio between the side lobes formed at opposite sides of the main lobe can be altered, as shown in FIG. 30.

The center of the temperature distribution of the medium heated by the reproduction laser beam is shifted backwards of the reproduction laser beam in accordance with movement of the recording medium. Accordingly, there will be a difference in the temperature rise arising from the main lobe at the frontward and backward side lobe positions with respect to the advancing direction of the beam. More specifically, the medium temperature at the side lobe position backward of the main lobe becomes higher than that of the side lobe positioned at the front due to the effect of the main lobe. It is desirable to render equal the temperature distribution of the recording medium arising from the side lobe radiation at both the frontward and backward side lobe positions in order to remove the influence of the side lobe. As shown in FIG. 30, the position of the light blocking body is shifted from the center of the beam in the advancing direction of the beam, whereby the intensity of the side lobe downstream of the advancing direction is rendered lower than the intensity of the side lobe upstream of the advancing direction. Thus, influence of the side lobe on the magnetically induced superresolution magneto-optical recording medium is reduced.

Figure 27:
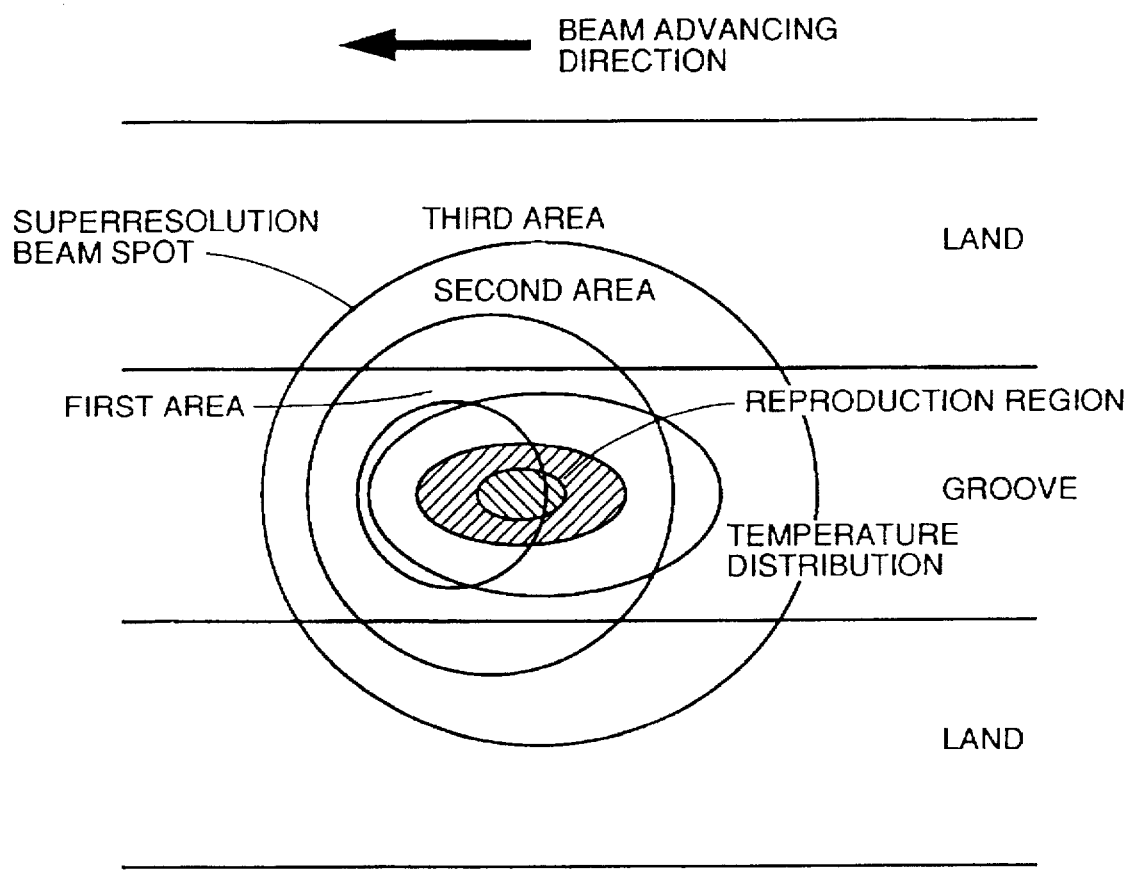
FIG. 27 shows the state on the magneto-optical recording medium irradiated with the beam when a circular light blocking body is inserted.

By shifting the position of the circular light blocking body shown in FIG. 19 in the advancing direction of the beam from the center of the beam, the side lobe located at the rear of the main lobe can be rendered less dense to reduce the influence on the temperature distribution of the recording medium arising from the main lobe at the rear region, as shown in FIG. 27.

The advantage of reproducing information from a magnetically induced superresolution magneto-optical recording medium with the optical head according to an embodiment of the present invention will be described hereinafter with reference to FIGS. 28A and 28B. In this optical head, the numerical aperture of the objective lens is 0.55, and the optical wavelength of the laser beam is 685 nm. Also, a rectangular light blocking body with a light blocking rate of 30% is provided.

Figure 28A:
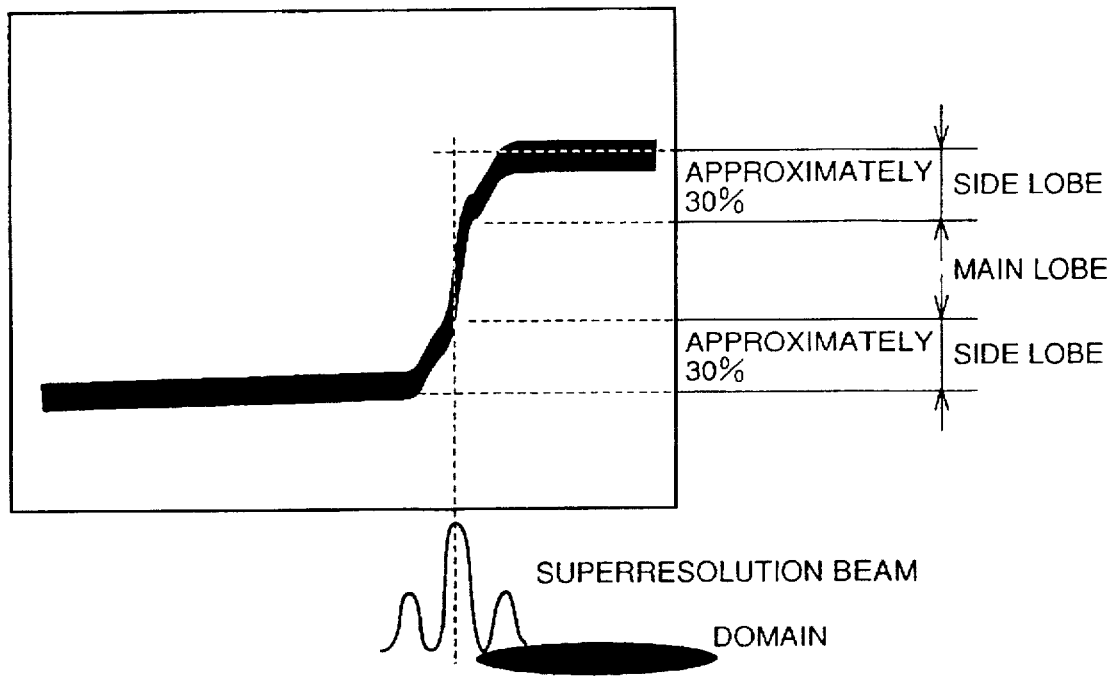
FIGS. 28A and 28B show comparison in reproduction with and without a rectangular light blocking body.
Figure 28B:
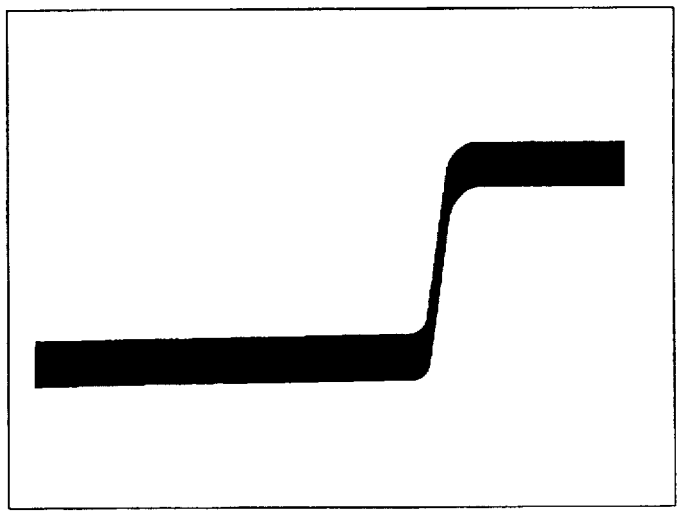

When a domain recorded on a normal magneto-optical recording medium is reproduced with this optical head, a stepped portion of a staircase is seen at the rising edge of a reproduced waveform by the side lobes as shown in FIG. 28A. It is appreciated from this stepped portion that the intensity of each side lobe is 30% of the entire intensity. When a domain recorded on a magnetically induced superresolution magneto-optical recording medium is reproduced with this optical head, a stepped portion of a staircase is not seen at the rising edge of the reproduced waveform, as in FIG. 28B. It is appreciated that the influence of the side lobes is removed by the magnetically induced superresolution. The term "magnetically induced superresolution" refers to the phenomenon that, in a magnetically induced superresolution magneto-optical recording medium, only the portion of the reproduction layer where the temperature becomes higher than a predetermined temperature by radiation of the main lobe has the magnetization of the recording layer transferred to the reproduction layer, and the portion where the side lobe is emitted does not have magnetization of the recording layer transferred to the reproduction layer due to its low temperature. In the example of FIG. 28B, a reproduced waveform with no stepped portion is obtained since only the portion where the main lobe is emitted has magnetization of the recording layer transferred, so that the crosstalk in the linear density direction caused by the side lobe is reduced. By a similar reason, the crosstalk in the track density direction caused by the side lobe can also be removed.

Figure 29:
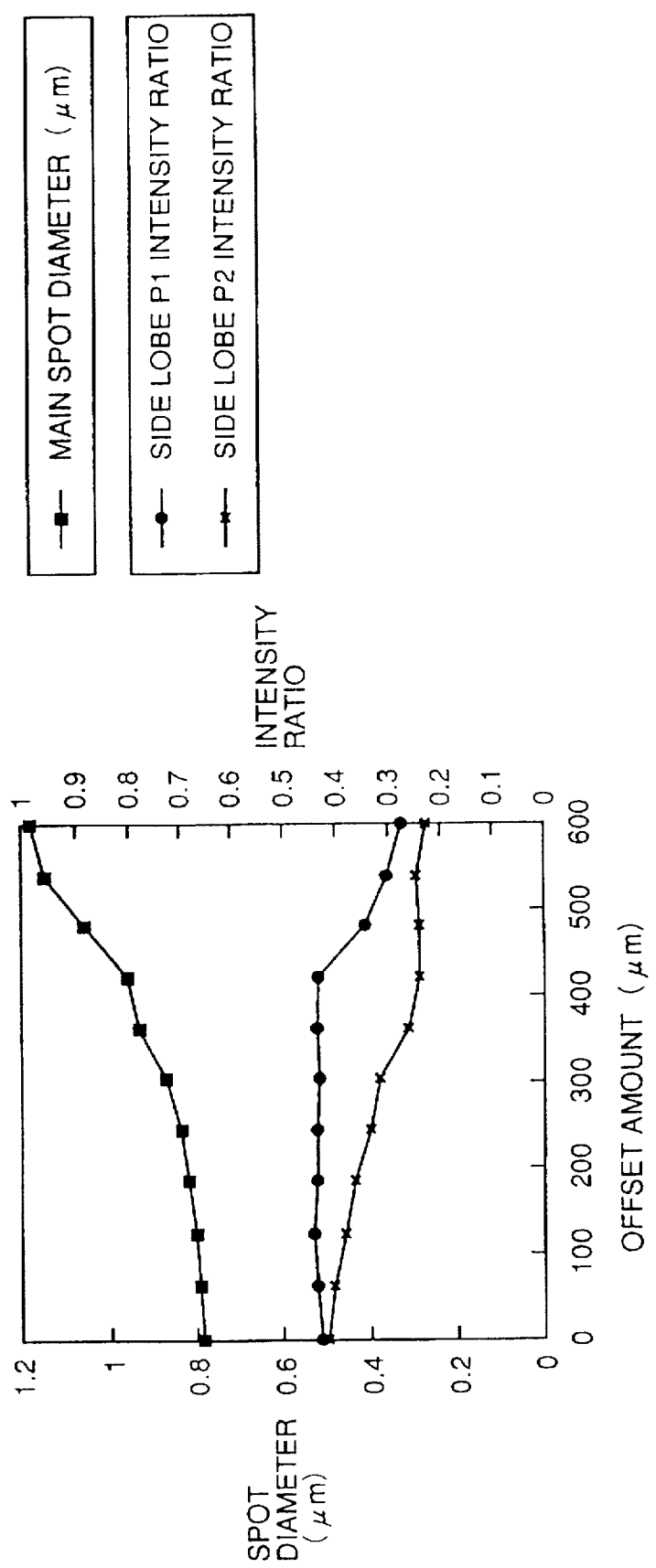
FIG. 29 shows the variation of the beam diameter of the main lobe and the intensity ratio of the side lobe with respect to the offset amount of the rectangular light blocking object.

Referring to FIG. 29, the relationship among the shift of the rectangular light blocking body (offset amount), intensity of the side lobes (P1, P2), and the beam diameter of the main lobe will be described when the position of the rectangular light blocking body is shifted from the center of the beam in the advancing direction of the beam.

The light blocking rate of the light blocking body is 30%. The numerical aperture of the objective lens is 0.55. The objective lens has an effective diameter of 3.63 mm. The laser beam has a wavelength of 685 nm. The beam diameter of the main lobe is gradually increased in proportion to increase in amount of offset of the rectangular light blocking body. The beam diameter of the main lobe suddenly increases when the amount of offset becomes greater than 400 μm (the offset amount with respect to the effective diameter of the objective lens is 8.3%). The intensity ratio of the side lobes is maximum in the vicinity of 400 μm, and is respectively 43% and 22% with respect to the main lobe intensity. An intensity ratio of approximately 2 times is obtained.

Since the temperature difference between the backward and frontward side lobes on the magneto-optical recording medium can be corrected by the shift (offset amount) of the light blocking body, the influence of the side lobe can be removed efficiently even when the side lobe is great due to a high light blocking rate. In the embodiment of the present invention, the offset amount of the light blocking rate is 50–400 μm, preferably 100–300 μm. The intensity ratio of the two side lobes in this case is 0.51–0.94, preferably 0.69–0.90. In the present example, the light blocking body may take a polygonal configuration other than a rectangular. Furthermore, the wavelength of the laser beam is not limited to 685 nm, and may take another wavelength value.

According to each embodiment of the present invention, a particular mechanism to prevent the side lobes from being emitted onto the disk does not have to be provided since influence of the side lobes can be removed when the optical superresolution method is employed. Therefore, the optical system of the reproduction device can be implemented with a more simple structure.

Figure 31:
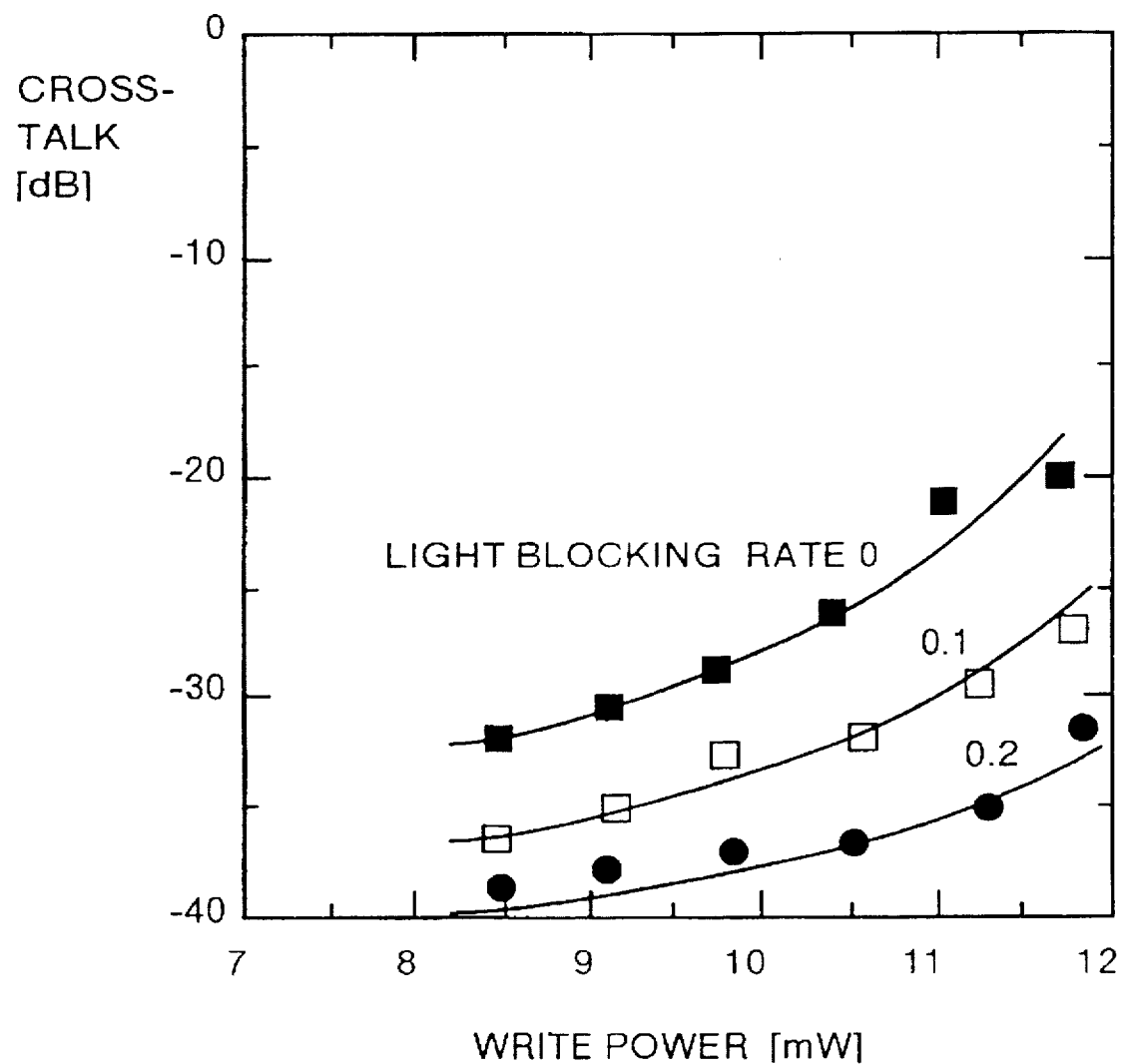
FIG. 31 is a graph showing the relationship between crosstalk and recording power of the optical head shown in FIG. 5 for each light blocking rate.

As shown in FIG. 31, crosstalk is reduced when the laser beam is blocked in comparison with the case where the laser beam is not blocked (when light blocking rate is 0). More specifically, crosstalk is reduced in accordance with the light blocking rate increasing from 0.1 to 0.2.

In order to remove the influence by the side lobes in the reproduced beam, the magnetically induced superresolution magneto-optical recording medium shown in FIGS. 2 and 3 can be used. As described before, the magnetically induced superresolution magneto-optical recording medium of FIG. 2 has an intermediate layer 8 between reproduction layer 3 and recording layer 4. Intermediate layer 8 serves to prevent transfer of magnetization into a reproduction layer from the recording layer in a low temperature portion within the portion irradiated with a laser beam. Therefore, high density reproduction that is not affected by the side lobe is allowed.

In the magnetically induced superresolution magneto-optical recording medium of FIG. 3, a photochromic layer 9 is inserted between substrate 1 and first dielectric layer 2. Photochromic layer 9 is formed of a material that has transmittance improved when irradiated with a laser beam. It serves to prevent the side lobes from arriving at the recording plane in reproduction to allow high density reproduction only with the main lobe.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An information recording and reproduction apparatus for a magneto-optical recording medium, comprising:
    means responsive to a recording signal indicating information to be recorded for applying a magnetic field to a signal recording plane of said magneto-optical recording medium,
    optical means commonly used both in recording and reproduction for emitting a laser beam to said signal recording plane of said magneto-optical recording medium, and detecting laser beam reflected from said signal recording plane, and
    means for reproducing information from said detected laser beam,
    wherein said optical means includes polarization control means for blocking an inner portion of the laser beam emitted from said optical means so that a laser beam formed of a main lobe and side lobes is emitted onto said signal recording plane only in reproduction.

2. An information recording and reproduction apparatus for a magneto-optical recording medium, comprising:
    means responsive to a recording signal indicating information to be recorded for applying a magnetic field to a signal recording plane of said magneto-optical recording medium,
    optical means commonly used both in recording and reproduction, for emitting a laser beam to said signal recording plane of said magneto-optical recording medium, and detecting a laser beam reflected from said signal recording plane, and
    means for reproducing information from said detected laser beam, wherein said optical means comprises a light source for generating said laser beam, polarization direction switching means for transmitting the generated laser beam while selectively rotating the direction of polarization of said laser beam, polarization selecting means receiving the laser beam transmitted through said polarization direction switching means for transmitting the laser beam at an outer portion thereof independent of the direction of polarization and transmitting only the laser beam that is polarized in a particular direction at an inner portion thereof, an objective lens subject to tracking control so as to be displaced with respect to said signal recording plane for collecting the laser beam transmitted through said polarization selecting means on said signal recording plane, and means for controlling said polarization direction switching means to rotate the direction of polarization of the laser beam emitted from said light source in a direction differing from said particular direction, so that an inner portion of said laser beam is blocked by said polarization selecting means to have a laser beam formed of a main lobe and side lobes enter said objective lens at the time of reproduction.

3. An information recording and reproduction apparatus for a magneto-optical recording disk, comprising:

means responsive to a recording signal indicating information to be recorded for applying a magnetic field to a signal recording plane of said magneto-optical recording medium, optical means commonly used both in recording and reproduction, for emitting a laser beam to said signal recording plane of said magneto-optical recording medium, and detecting a laser beam reflected from said signal recording plane, and means for reproducing information from said detected laser beam, wherein said optical means comprises a light source for generating said laser beam, polarization direction switching means for transmitting the generated laser beam while selectively rotating the direction of polarization of said laser beam in different directions between its outer portion and inner portion, polarization selecting means receiving the laser beam transmitted through said polarization direction switching means for transmitting only the laser beam that is polarized in a particular direction, an objective lens subject to tracking control so as to be displaced with respect to said signal recording plane for collecting the laser beam transmitted through said polarization selecting means on said signal recording plane, and means for controlling said polarization direction switching means to rotate the direction of polarization of the laser beam emitted from said light source in said particular direction at said outer portion, and in a direction differing from said particular direction at said inner portion, so that an inner portion of said laser beam is blocked by said polarization selecting means to have a laser beam formed of a main lobe and side lobes enter said objective lens at the time of reproduction.

4. The information recording and reproduction apparatus according to claim 3, wherein said magneto-optical recording medium is a magnetically induced superresolution magneto-optical recording medium having a magnetic multilayer film structure including a recording layer and a reproduction layer.

5. The information recording and reproduction apparatus according to claim 3, wherein said polarization direction switching means rotates the direction of polarization of a laser beam electrically.

6. The information recording and reproduction apparatus according to claim 5, wherein said polarization direction switching means comprises liquid crystal.

7. The information recording and reproduction apparatus according to claim 6, wherein said liquid crystal is a TN type liquid crystal.

8. The information recording and reproduction apparatus according to claim 6, wherein said liquid crystal is a STN type liquid crystal.

9. The information recording and reproduction apparatus according to claim 6, wherein said liquid crystal is a ferroelectric type liquid crystal.

10. The information recording and reproduction apparatus according to claim 3, wherein said polarization direction switching means rotates the direction of polarization of a laser beam magnetically.

11. The information recording and reproduction apparatus according to claim 3, wherein said polarization selecting means includes a polarization hologram.

12. The information recording and reproduction apparatus according to claim 3, wherein said polarization selecting means includes a guest-host type liquid crystal.

13. The information recording and reproduction apparatus according to claim 3, wherein said polarization selecting means includes a glass polarizer formed of metal atoms in a regular arrangement for transmitting only light having a predetermined direction of polarization.

14. The information recording and reproduction apparatus according to claim 3, wherein said polarization selecting means includes a glass polarizer formed in silver atoms in a regular arrangement for transmitting only light having a predetermined direction of polarization.

15. The information recording and reproduction apparatus according to claim 3, wherein said polarization selecting means includes an optical material with an optical thin film having selectivity of the direction of polarization formed at its surface.

16. The information recording and reproduction apparatus according to claim 3, wherein said polarization direction switching means has an inner portion of a circular configuration.

17. The information recording and reproduction apparatus according to claim 16, wherein said circular inner portion is offset from the center of the laser beam.

18. The information recording and reproduction apparatus according to claim 3, wherein said polarization direction switching means has an inner portion of a polygonal configuration.

19. The information recording and reproduction apparatus according to claim 18, wherein said polygonal inner portion is formed so that its longitudinal direction is perpendicular to a tangential direction of a recording track.

20. The information recording and reproduction apparatus according to claim 19, wherein said polygonal inner portion is offset from the center of the laser beam.

21. The information recording and reproduction apparatus according to claim 3, wherein said polarization selecting means includes a polarization beam splitter.

* * * * *